United States Patent [19]

Asano

[11] Patent Number: 5,531,071
[45] Date of Patent: Jul. 2, 1996

[54] HYDRAULIC SYSTEM

[75] Inventor: Youji Asano, Gifu-ken, Japan

[73] Assignee: Teijin Seiki Co., Ltd., Osaka, Japan

[21] Appl. No.: 515,528

[22] Filed: Aug. 15, 1995

[30] Foreign Application Priority Data

Aug. 22, 1994 [JP] Japan .................................. 6-219460

[51] Int. Cl.$^6$ .............................. F16D 31/02; F15B 15/26
[52] U.S. Cl. .................. 60/441; 60/493; 60/494; 91/447; 91/45
[58] Field of Search .......................... 60/435, 436, 441, 60/468, 493, 494; 91/45, 446, 447

[56] References Cited

U.S. PATENT DOCUMENTS

| | | | |
|---|---|---|---|
| 4,368,798 | 1/1983 | Meyerle et al. | 60/441 X |
| 4,464,898 | 8/1984 | Aoyagi et al. | 60/441 X |
| 4,481,769 | 11/1984 | Nagahara | 60/441 |
| 4,495,767 | 1/1985 | Akiyama et al. | 60/435 X |
| 4,543,786 | 10/1985 | Shuler | 60/441 X |
| 4,557,109 | 12/1985 | Nagahara et al. | 91/45 X |
| 4,858,435 | 8/1989 | Ikeda | 60/441 |
| 5,209,064 | 5/1993 | Noel et al. | 91/45 X |

*Primary Examiner*—Hoang Nguyen
*Attorney, Agent, or Firm*—Lane, Aitken & McCann

[57] ABSTRACT

A hydraulic system comprises a mechanical brake assembly having a brake piston engageable with an output rotation shaft of a hydraulic motor, a cylindrical casing having the brake piston slidably received therein and a brake spring resiliently urging the brake piston to engage with the output rotation shaft of the hydraulic motor. The brake piston and the cylindrical casing collectively define a main hydraulic chamber held in fluid communication with a release fluid passageway which is communicable with a hydraulic pump and a reservoir tank through a shuttle valve and a directional control valve. The brake piston and the cylindrical casing further collectively define a secondary hydraulic chamber held in fluid communication with the release fluid passageway through a fluid feed/return passageway on which a brake resistance restrictor provided for restricting flow of the working fluid in the fluid feed/return passageway. The pressure of the working fluid in the secondary hydraulic chamber is exerted on the brake piston so as to resist the resilient force of the brake spring of the mechanical brake assembly. If the hydraulic system thus constructed is applied, for instance, to a driving apparatus of a crawler vehicle, the hydraulic system is capable of effectively preventing the crawler vehicle from incurring a mighty shock at the time when the crawler vehicle is decelerated and stopped.

14 Claims, 9 Drawing Sheets

HYDRAULIC SYSTEM

FIELD OF THE INVENTION

The present invention relates to a hydraulic system, and more particularly to a hydraulic system comprising a hydraulic motor and a mechanical brake assembly for braking the hydraulic motor and adapted, for example, to a driving device of a crawler vehicle.

DESCRIPTION OF THE PRIOR ART

A conventional hydraulic system is disclosed, for example, in Japanese patent laid-open publication No. 4-138960 and shown in FIG. 9 as comprising a hydraulic pump 210, a hydraulic motor 220, a mechanical brake assembly 230, a directional control valve 240, a counterbalance valve 250, a pilot hydraulic circuit 260, a reservoir tank 271, a relief valve 272, check valves 273 to 277 and restrictors 278 and 279. The hydraulic pump 210 sucks in working fluid reserved by the reservoir tank 271 to increase in pressure and deliver the working fluid. The hydraulic motor 220 is a fixed displacement axial piston motor and has an output rotation shaft (not shown) mechanically connected to driving axle (not shown) of a crawler vehicle. The hydraulic motor 220 includes a motor casing (not shown) formed with first and second inlet/outlet ports 221 and 222. The working fluid is supplied from the hydraulic pump 210 to one of the first and second inlet/outlet ports 221 and 222 through one of first and second fluid supply/discharge passageways 281 and 282 and discharged from the other of the first and second inlet/outlet ports 221 and 222 to the reservoir tank 27 1 through the other of the first and second fluid supply/discharge passageways 281 and 282. When the working fluid from the hydraulic pump 210 is received by the first inlet/outlet port 221 of the hydraulic motor 220, the output rotation shaft of the hydraulic motor 220 is rotated in a direction. When the working fluid from the hydraulic pump 210 is received by the second inlet/outlet port 222 of the hydraulic motor 220, the output rotation shaft of the hydraulic motor 220 is rotated in the opposite direction.

The mechanical brake assembly 230 comprises a brake piston 231 engageable with the output rotation shaft of the hydraulic motor 220 through a pair of friction pads which are respectively fixed to the motor casing of the hydraulic motor 220 and the output rotation shaft of the hydraulic motor 220. The mechanical brake assembly 230 further comprises a cylindrical casing 232 for having the brake piston 231 slidably received therein and a brake spring 233 for resiliently urging the brake piston 231 to engage with the output rotation shaft of the hydraulic motor 220. The brake piston 231 and the cylindrical casing 232 of the mechanical brake assembly 230 collectively define a hydraulic chamber 234 to which the working fluid is supplied through a release fluid passageway 283 and from which the working fluid is discharged through the release fluid passageway 283. The pressure of the working fluid in the hydraulic chamber 234 is exerted on an effective area of the brake piston 231 to disengage the brake piston 231 from the output rotation shaft of the hydraulic motor 220 against resilient force of the brake spring 233. In the mechanical brake assembly 230 thus constructed, the output rotation shaft of the hydraulic motor 220 is mechanically braked by the resilient force of the brake spring 233 through the brake piston 231 when the working fluid is discharged from the hydraulic chamber 234 through the release fluid passageway 283. When, reversely, the working fluid is supplied to the hydraulic chamber 234 through the release fluid passageway 283, the rotation shaft of the hydraulic motor 220 is released from the brake piston 231 by the pressure of working fluid in the hydraulic chamber 234 and consequently freely rotatable both in the different directions.

The directional control valve 240 is provided on the first and second fluid supply/discharge passageways 281 and 282 and operative to assume three different valve positions in accordance with manual operation by a crawler vehicle driver. The three different valve positions consist of a first directional control valve position 240a in which the working fluid is permitted to be supplied from the hydraulic pump 210 to the first fluid supply/discharge passageway 281 and to be discharged from the second fluid supply/discharge passageway 282 to the reservoir tank 271, a second directional control valve position 240b in which the working fluid is permitted to be discharged from the first and second fluid supply/discharge fluid passageways 281 and 282 to the reservoir tank 271, and a third directional control valve position 240c in which the working fluid is permitted to be supplied from the hydraulic pump 210 to the second fluid supply/discharge passageway 282 and to be discharged from the first fluid supply/discharge passageway 281.

The counterbalance valve 250 is provided on the release fluid passageway 283, and the first and second fluid supply/discharge passageways 281 and 282 between the hydraulic pump 210 and the directional control valve 240. On the first fluid supply/discharge passageway 281, the counterbalance valve 250 is arranged in parallel with the check valve 273 that is adapted to permit the working fluid to flow only from the directional control valve 240 toward the hydraulic motor 220. On the second fluid supply/discharge fluid passageway 282, likewise, the counterbalance valve 250 is arranged in parallel with the check valve 274 that is adapted to permit the working fluid to flow only from the directional control valve 240 toward the hydraulic motor 220. The counterbalance valve 250 is operative to three different counterbalance valve positions in accordance with difference in pressure between pilot hydraulic chambers 251 and 252. The counterbalance valve positions consist of a first and second counterbalance valve positions 250a and 250b in each of which the working fluid is permitted to flow in the first fluid supply/discharge passageway 281 between the hydraulic motor 220 and the directional control valve 240 and in the second fluid supply/discharge passageway 282 between the hydraulic motor 220 and the directional control valve 240, and a third counterbalance valve position 250c in which the working fluid is interrupted from flowing in the first fluid supply/discharge passageway 281 between the hydraulic motor 220 and the directional control valve 240 and in the second fluid supply/discharge passageway 282 between the hydraulic motor 220 and the directional control valve 240. The release fluid passageway 283 is brought into fluid communication with the first fluid supply/discharge passageway 281 when the counterbalance valve 250 is shifted to assume the first counterbalance valve position 250a. When the counterbalance valve 250 is shifted to assume the second counterbalance valve position 250b, the release fluid passageway 283 is brought into fluid communication with the second fluid supply/discharge passageway 281. When the counterbalance valve 250 is shifted to assume the second counterbalance valve position 250c, the release fluid passageway 283 is brought into fluid communication with a fluid drain passageway 284. The pilot hydraulic chamber 251 of the counterbalance valve 250 is held in fluid communication with the first fluid supply/discharge passageway 281 by way of the restrictor 278 and the check valve 276 arranged in parallel with each other. In like manner, the pilot hydraulic chamber 252 is held in fluid communication with the second fluid supply/discharge passageway 282 by way of the restrictor 279 and the check valve 277 arranged in parallel with each other. The pilot hydraulic circuit 260 comprises a check valve 261 and a restrictor 262 provided on the release fluid passageway 283 in parallel relationship to each other.

The conventional hydraulic system thus constructed is operated as described below. If the directional control valve 240 is operated to assume the first directional control valve position 240a, the counterbalance valve 250 is shifted to assume the first counterbalance valve 250a and as a consequence the working fluid of high pressure is supplied from the hydraulic pump 210 to the inlet/outlet port of the hydraulic motor 220. At the same time, the working fluid of high pressure is supplied from the hydraulic pump 210 to the hydraulic chamber 234 of the mechanical brake 230 by way of the restrictor 262 of the pilot hydraulic circuit 260 and accordingly causes the brake piston 231 to disengage from the output rotation shaft of the hydraulic motor 220 against the resilient force of the brake spring 233 of the mechanical brake assembly 230. As a result, the output rotation shaft of the hydraulic motor 220 is rotated to provide the drive axle of the crawler vehicle with driving force. When the directional control valve 240 is operated to assume the second directional control valve position 240b, the working fluid in the first and second fluid supply/discharge passageways 281 and 282 are discharged to the reservoir tank 271 and decreased in pressure. Simultaneously, the working fluid in the hydraulic chamber 234 of the mechanical brake assembly 230 is discharged to the reservoir tank 271 through the release fluid passageway 283 and the first fluid supply/discharge passageway 281, and accordingly the output rotation shaft of the hydraulic motor 220 is braked by and brought into a halt by the brake spring 233 of the mechanical brake assembly 230. If, at this time, the output rotation shaft of the hydraulic motor 220 is rotated at high speed and continues to rotate for a while, the hydraulic motor 220 serves as a hydraulic pump. In this instance, the counterbalance valve 250 is shifted to assume the third counterbalance valve 250 due to the pressure of the working fluid in the pilot hydraulic chamber 251 held at high level in comparison with that in the pilot hydraulic chamber 252 by the restrictor 278 for a while. This result in the fact that the working fluid is interrupted by the check valve 273 and the counterbalance valve 250 from flowing in the first fluid supply/discharge passageway 281 between the hydraulic motor 220 and the counterbalance valve 250, thereby furnishing the hydraulic motor 220 with hydraulic resistance. Consequently, the output rotation shaft of the hydraulic motor 220 is braked by a mechanical brake force depending upon the brake spring 233 of the mechanical brake assembly 230 and the hydraulic brake force generated by the operation of the counterbalance valve 250.

The foregoing conventional control apparatus, however, entails a drawback that the crawler vehicle incurs a mighty shock represented by deceleration exceeding, for example, 0.4 g at the time when the crawler vehicle is stopped. More specifically, the mechanical brake assembly 230 is used as a brake system for holding the crawler vehicle in a halt as well as for bringing the crawler vehicle into a halt. This means that the brake spring 233 of the mechanical brake assembly 230 is required to have an extremely powerful resilience. The brake spring 233, therefore, has the crawler vehicle decelerated extremely rapidly when the mechanical brake 30 is at work, thereby causing the crawler vehicle to incur the extremely mighty shock.

The present invention contemplates provision of a hydraulic system overcoming a drawback of prior-art hydraulic system of the described general natures.

SUMMARY OF THE INVENTION

According to one aspect of the present invention there is provided a hydraulic system comprising a reservoir tank reserving working fluid, a hydraulic pump sucking in the working fluid from the reservoir tank to increase in pressure and deliver the working fluid, a hydraulic motor having first and second inlet/outlet ports and having an output rotation shaft, the working fluid being supplied from the hydraulic pump to one of the first and second inlet/outlet ports through one of first and second fluid supply/discharge passageways and discharged from the other of the first and second inlet/outlet ports to the reservoir tank through the other of the first and second fluid supply/discharge passageways, the output rotation shaft being rotated in a direction when the working fluid from the hydraulic pump is received by the first inlet/outlet port, and the output rotation shaft being rotated in the opposite direction when the working fluid from the hydraulic pump is received by the second inlet/outlet port, a mechanical brake assembly having a brake piston engageable with the output rotation shaft of the hydraulic motor, a cylindrical casing having the brake piston slidably received therein and a brake spring resiliently urging the brake piston to engage with the output rotation shaft of the hydraulic motor, the brake piston and the cylindrical casing collectively defining a main hydraulic chamber to which the working fluid is supplied through a release fluid passageway and from which the working fluid is discharged through the release fluid passageway, the brake piston having a first piston area portion on which pressure of the working fluid in the main hydraulic chamber is exerted so as to disengage the brake piston from the output rotation shaft of the hydraulic motor against resilient force of the brake spring, the output rotation shaft of the hydraulic motor being mechanically braked by the resilient force of the brake spring through the brake piston when the working fluid is discharged from the main hydraulic chamber of the mechanical brake assembly, and the output rotation shaft of the hydraulic motor being released from the brake piston by fluid pressure of the working fluid in the main hydraulic chamber when the working fluid is supplied to the main hydraulic chamber of the mechanical brake assembly; a shuttle valve provided on the first and second fluid supply/discharge passageways for having the release fluid passageway held in fluid communication selectively with the first and second fluid supply/discharge passageways, the working fluid in one of the first and second fluid supply/discharge passageways held in fluid communication with the release fluid passageway being higher in pressure than that in the other of the first and second fluid supply/discharge passageways, a directional control valve provided on the first and second fluid supply/discharge passageways, and operative to assume three different directional control valve positions consisting of a first directional control valve position in which the working fluid is permitted to be supplied from the hydraulic pump to the first fluid supply/discharge passageway and to be discharged from the second fluid supply/discharge passageway to the reservoir tank, a second directional control valve position in which the working fluid is permitted to be discharged from the first and second fluid supply/discharge passageways to the reservoir tank, and a third directional control valve position in which the working fluid is permitted to be supplied from the hydraulic pump to the second fluid supply/discharge passageway and to be discharged from the first fluid supply/discharge passageway, and a counterbalance valve provided on the first and second fluid supply/discharge passageways between the hydraulic pump and the directional control valve, the counterbalance valve being operative to prevent the working fluid from being forced by the hydraulic motor into one of the first and second fluid supply/discharge passageways when the hydraulic motor is still at work under condition that the directional control valve is shifted to assume the second directional control valve position, the brake piston and the cylindrical casing further defining a secondary hydraulic chamber held in fluid communication with the release fluid passageway through a fluid feed/return passageway, the brake piston having a second piston area portion on which pressure of the working fluid in the secondary hydraulic chamber is exerted so as to resist the resilient force of the brake spring, and the hydraulic system further comprising a brake resistance restrictor provided on the fluid feed/return passageway for restricting flow of the working fluid in the fluid feed/return passageway.

According to another aspect of the present invention there is provided a hydraulic system comprising a reservoir tank reserving working fluid, a hydraulic pump sucking in the working fluid from said reservoir tank to increase in pressure and deliver the working fluid, a hydraulic motor having first and second inlet/outlet ports and having an output rotation shaft, the working fluid being supplied from said hydraulic pump to one of said first and second inlet/outlet ports through one of first and second fluid supply/discharge passageways and discharged from the other of said first and second inlet/outlet ports to said reservoir tank through the other of said first and second fluid supply/discharge passageways, said output rotation shaft being rotated in a direction when the working fluid from said hydraulic pump is received by said first inlet/outlet port, and said output rotation shaft being rotated in the opposite direction when the working fluid from said hydraulic pump is received by said second inlet/outlet port, a mechanical brake assembly having a brake piston engageable with said output rotation shaft of said hydraulic motor, a cylindrical casing having said brake piston slidably received therein and a brake spring resiliently urging said brake piston to engage with said output rotation shaft of said hydraulic motor, said brake piston and said cylindrical casing collectively defining a main hydraulic chamber to which the working fluid is supplied through a release fluid passageway and from which the working fluid is discharged through said release fluid passageway, said brake piston having a first piston area portion on which pressure of the working fluid in said main hydraulic chamber is exerted so as to disengage said brake piston from said output rotation shaft of said hydraulic motor against resilient force of said brake spring, said output rotation shaft of said hydraulic motor being mechanically braked by the resilient force of said brake spring through said brake piston when the working fluid is discharged from said main hydraulic chamber of said mechanical brake assembly, and said output rotation shaft of said hydraulic motor being released from said brake piston by fluid pressure of the working fluid in said main hydraulic chamber when the working fluid is supplied to said main hydraulic chamber of said mechanical brake assembly, a shuttle valve provided on said first and second fluid supply/discharge passageways for having said release fluid passageway held in fluid communication selectively with said first and second fluid supply/discharge passageways, the working fluid in one of said first and second fluid supply/discharge passageways held in fluid communication with said release fluid passageway being higher in pressure than that in the other of said first and second fluid supply/discharge passageways, a directional control valve provided on said first and second fluid supply/discharge passageways, and operative to assume three different directional control valve positions consisting of a first directional control valve position in which the working fluid is permitted to be supplied from said hydraulic pump to said first fluid supply/discharge passageway and to be discharged from said second fluid supply/discharge passageway to said reservoir tank, a second directional control position in which the working fluid is permitted to be discharged from said first and second fluid supply/discharge passageways to said reservoir tank, and a third directional control valve position in which the working fluid is permitted to be supplied from said hydraulic pump to said second fluid supply/discharge passageway and to be discharged from said first fluid supply/discharge passageway, and a counterbalance valve provided on said first and second fluid supply/discharge passageways between said hydraulic pump and said directional control valve, said counterbalance valve being operative to prevent the working fluid from being forced by said hydraulic motor into one of said first and second fluid supply/discharge passageways when said hydraulic motor is still at work under condition that said directional control valve is shifted to assume said second directional control valve position, said brake piston and said cylindrical casing further defining a secondary hydraulic chamber held in fluid communication with said reservoir tank through a fluid feed/return passageway, said brake piston having a second piston area portion on which pressure of the working fluid in said secondary hydraulic chamber is exerted so as to resist the resilient force of said brake spring, and said hydraulic system further comprising a brake resistance restrictor provided on said fluid feed/ return passageway for restricting flow of the working fluid in said fluid feed/return passageway.

According to a further aspect of the present invention there is provided a hydraulic system comprising a reservoir tank reserving working fluid, a hydraulic pump sucking in the working fluid from the reservoir tank to increase in pressure and deliver the working fluid, a hydraulic motor having first and second inlet/outlet ports and having an output rotation shaft, the working fluid being supplied from the hydraulic pump to one of the first and second inlet/outlet ports through one of first and second fluid supply/discharge passageways and discharged from the other of the first and second inlet/outlet ports to the reservoir tank through the other of the first and second fluid supply/discharge passageways, the output rotation shaft being rotated in a direction when the working fluid from the hydraulic pump is received by the first inlet/outlet port, and the output rotation shaft being rotated in the :opposite direction when the working fluid from the hydraulic pump is received by the second inlet/outlet port, a mechanical brake assembly having a brake piston engageable with the output rotation shaft of the hydraulic motor, a cylindrical casing having the brake piston slidably received therein and a brake spring resiliently urging the brake piston to engage with the output rotation shaft of the hydraulic motor, the brake piston and the cylindrical casing collectively defining a main hydraulic chamber to which the working fluid is supplied through a release fluid passageway and from which the working fluid is discharged through the release fluid passageway, the brake piston having a first piston area portion on which pressure of the working fluid in the main hydraulic chamber is exerted so as to disengage the brake piston from the output rotation shaft of the hydraulic motor against resilient force of the brake spring, the output rotation shaft of the hydraulic motor being mechanically braked by the resilient force of the brake spring through the brake piston when the working fluid is discharged from the main hydraulic chamber of the mechanical brake assembly, and the output rotation shaft of the hydraulic motor being released from the brake piston by fluid pressure of the working fluid in the main hydraulic chamber when the working fluid is supplied to the main hydraulic chamber of the mechanical brake assembly, a shuttle valve provided on the first and second fluid supply/discharge passageways for having the release fluid passageway held in fluid communication selectively with the first and second fluid supply/discharge passageways, the working fluid in one of the first and second fluid supply/discharge passageways held in fluid communication with the release fluid passageway being higher in pressure than that in the other of the first and second fluid supply/discharge passageways, a directional control valve provided on the first and second fluid supply/discharge passageways, and operative to assume three different directional control valve positions consisting of a first directional control valve position in which the working fluid is permitted to be supplied from the hydraulic pump to the first fluid supply/discharge passageway and to be discharged from the second fluid supply/discharge passageway to the reservoir tank, a second directional control valve position in which the working fluid is permitted-to be discharged from the first and second fluid supply/discharge passageways to the reservoir tank, and a third directional control valve position in which the working fluid is permitted to be supplied from the hydraulic pump to the second fluid supply/discharge passageway and to be discharged from the first fluid supply/discharge passageway; and a counterbalance valve provided on the first and second fluid supply/discharge passageways between the hydraulic pump and the directional control valve, the counterbalance valve being operative to prevent the working fluid from being forced by the hydraulic motor into one of the first and second fluid supply/discharge passageways when the hydraulic motor is still at work under condition that the directional control valve is shifted to assume the second directional control valve position, the brake piston and the casing further defining a secondary hydraulic chamber, the brake piston having a second piston area portion on which pressure of the working fluid in the secondary hydraulic chamber is exerted so as to resist the resilient force of the brake spring, the hydraulic system further comprising a selection valve provided on the first and second fluid supply/discharge passageways and operative to assume three different valve positions consisting of a first selection valve position in which the working fluid is permitted to flow between the first fluid supply/discharge passageway and the secondary hydraulic chamber through a fluid feed/return passageway and interrupted from flowing between the second fluid supply/discharge passageway and the secondary hydraulic chamber through the fluid feed/return passageway, a second selection valve position in which the working fluid is interrupted from flowing between the first fluid supply/discharge passageway and the secondary hydraulic chamber and between the second fluid supply/discharge passageway and the secondary hydraulic chamber through the fluid feed/return passageway, and a third selection valve position in which the working fluid is permitted to flow between the second fluid supply/discharge passageway and the secondary hydraulic chamber through the fluid feed/return passageway and interrupted from flowing between the first fluid supply/discharge passageway and the secondary hydraulic chamber through the fluid feed/return passageway, the selection valve being operated to assume the first selection valve position when the pressure of the working fluid in the first fluid supply/discharge passageway is smaller than that in the second fluid supply/discharge passageway, the selection valve being operated to assume the second selection valve position when the pressure of the working fluid in the first fluid supply/discharge passageway is equal to that in the second fluid supply/discharge passageway, the selection valve being operated to assume the third selection valve position when the pressure of the working fluid in the first fluid supply/discharge passageway is larger than that in the second fluid supply/discharge passageway, and the hydraulic system further comprising a brake resistance restrictor provided on the fluid feed/return passageway for restricting flow of the working fluid in the fluid feed/return passageway.

BRIEF DESCRIPTION OF THE DRAWINGS

The features and advantages of a hydraulic system in accordance with the present invention will be more clearly understood from the following description taken in conjunction with the accompanying drawings in which.

DESCRIPTION OF THE PREFERRED EMBODIMENTS

Referring now to FIGS. 1 to 5 of the accompanying drawings, a first preferred embodiment of the present invention will be described hereinafter in detail.

Figure 1:
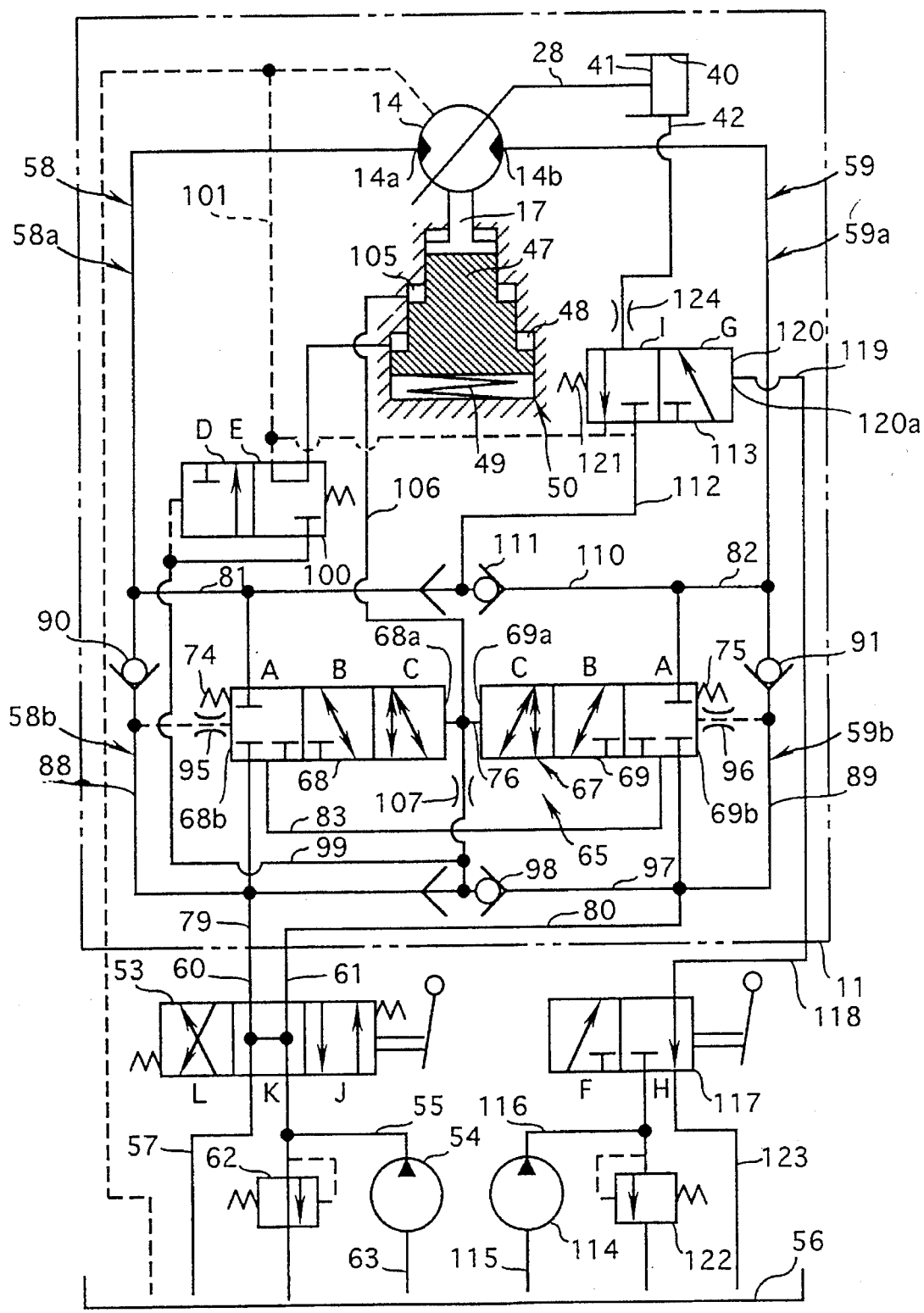
FIG. 1 is a schematic view showing a first preferred embodiment of the hydraulic system according to the present invention.
Figure 2:
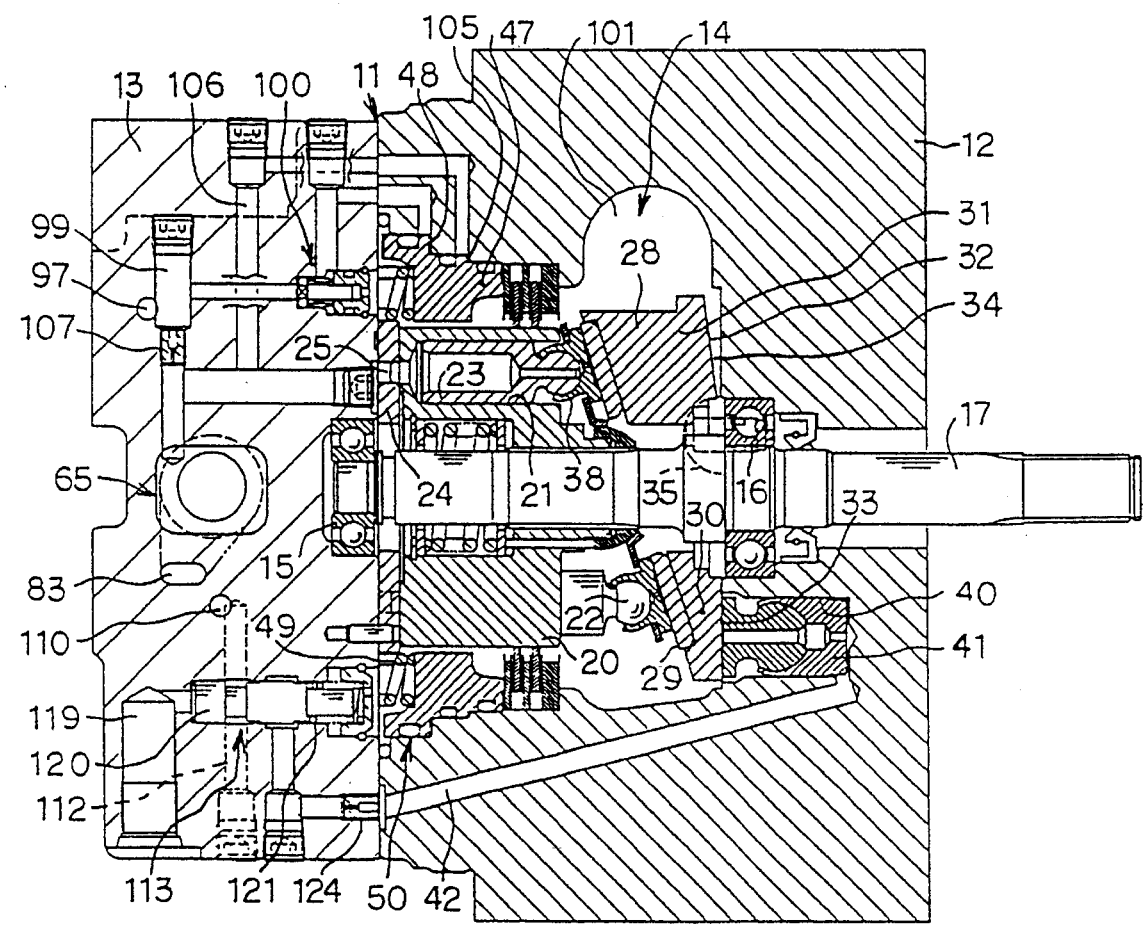
FIG. 2 is a sectional view showing a hydraulic apparatus partly adopting the hydraulic system shown in FIG. 1.

In FIG. 1, a hydraulic system embodying the present invention comprises a reservoir tank 56 reserving working fluid and a hydraulic pump 54 sucking in the working fluid from the reservoir tank 56 by way of a fluid suck passageway 63 to increase in pressure and deliver the working fluid. The hydraulic system is shown in FIG. 2 as comprising a casing 11 fixedly attached to a frame member of a crawler vehicle not shown and including a cylindrical casing 12 and a valve casing 13 tightly connected to each other. The cylindrical casing 12 accommodates a cam plate type hydraulic motor for driving the crawler vehicle. The cam plate type hydraulic motor 14 comprises an output rotation shaft 17 rotatably supported by the cylindrical casing 12 and the valve casing 13 by way of bearings 15 and 16. The output rotation shaft 17 has one end portion protruded from the cylindrical casing 12 and securely connected to a sprocket held in mesh with a crawler, neither of the sprocket and crawler being shown.

The hydraulic motor 14 is shown in FIG. 1 as having first and second inlet/outlet ports 14a and 14b. The working fluid is supplied from the hydraulic pump 54 to one of the first and second inlet/outlet ports 14a and 14b through one of first and second fluid supply/discharge passageways 58 and 59 and discharged from the other of the first and second inlet/outlet ports 14a and 14b to the reservoir tank 56 through the other of the first and second fluid supply/discharge passageways 58 and 59. The output rotation shaft 17 of the hydraulic motor 14 is rotated in a direction at the time when the working fluid from the hydraulic pump 54 is received by the first inlet/outlet port 14a, rotated in the opposite direction at the time when the working fluid from the hydraulic pump 54 is received by the second inlet/outlet port 14b.

Turning back to FIG. 2, a reference numeral 20 denotes a cylinder block in which the other end of the rotation shaft 17 is housed and to which the other end of the rotation shaft 17 is connected through a spline connection. The cylinder block 20 is formed with a plurality of cylinder through bores 21 arranged in circumferentially equiangularly spaced relationship to each other and axially extending from one end of the cylinder block 20 to the other end portion of the cylinder block 20 in a parallel relation ship to the rotation shaft 17. The cylinder block 20 have a plurality of projection plungers 23 slidably received in the cylinder through bores 21, respectively, each of the projection plungers 23 being formed with a globular portion 22 each capable of being protruded from one end portion of the cylinder block 20.

A reference numeral 24 denotes a timing plate that is fixedly connected to the valve casing 13 and intervenes between the cylinder block 20 and the valve casing 13. The timing plate 24 is formed with a pair of arched through bores 25 symmetrically arranged with respect to an axis of the cylinder block 20 and each brought alternatively into fluid communication with and into fluid discommunication with the cylinder through bores 21 in accordance with the rotation of the cylinder block 21 about the output rotation shaft 17 with respect to the timing plate 20.

Between the other end portion of the cylinder block 20 and the cylindrical casing 12, is disposed a ring-shaped cam plate 28 through which the output rotation shaft 17 penetrates. The camp plate 28 has a slant surface 29 that is slanted with respect to an imaginary plane intersecting the output rotation shaft 17 of the hydraulic motor 14 at a right angle and as a consequence the cam plate 28 is divided into a thin plate portion 30 and a thick plate portion 31 by an imaginary plane on which the rotation axis of the output rotation shaft 17 of the hydraulic motor 14 extends. The cam plate 28 further has a back surface 32 comprising a first flat surface 33 that is parallel to the imaginary plane intersecting the output rotation shaft 17 at a right angle and partially forms a surface of the thin plate portion 30 of the cam plate 28, and a second flat surface 34 that is slanted with respect to the first flat surface 33 at a predetermined little angle and partially forms a surface of the thick plate portion 31 of the cam plate 28. The cam plate 28 is adapted to be pivotable with respect to a fulcrum member 35 disposed on a boundary between the first and second flat surfaces 33 and 34 to assume two different cam plate positions consisting of a first cam plate position in which the first flat surface 33 of the cam plate 28 is held in contact with an inner flat surface of the cylindrical casing 12, and a second cam plate position in which the second flat surface 34 of the cam plate 28 is held in contact with the inner flat surface of the cylindrical casing 12. The slant surface 29 of the cam plate 28 is slidably engaged with a plurality of shoe members 38 which is equal in number to the projection plungers 23, and each which has a recess and is connected to each of the projection plungers 23 in such a way that the recess of each of the shoe members 38 has the globular portion 22 of each of the projection plungers 23 pivotably received therein.

The cylindrical casing 12 is formed with a cylinder chamber 40 which is opened at the inner surface of the cylindrical casing 12 facing to the first flat surface 33 of the cam plate 28 and in which a press piston 41 is slidably received. The cylindrical casing 12 is further formed with a speed change fluid passageway 42 on which a restrictor 124 is provided and which is held in fluid communication with the cylinder chamber 40. When the working fluid of high pressure is supplied to the cylinder chamber 40 by way of the speed change fluid passageway 42, the press piston 41 is caused by the working fluid of high pressure to protrude from the inner surface of the cylindrical casing 12 and accordingly causes the cam plate 28 to be shifted from the first cam plate position to the second cam plate position. When, on the other hand, the working fluid of high pressure is interrupted to be supplied to the cylinder chamber 40 by the way of the speed change fluid passageway 42, the cam plate 28 is shifted to assume the second plate position to the first plate position. The cam plate 23 thus shiftable to assume the first and second cam plate positions enables the projection plungers 23 contained in the cylinder block 20 to axially move with different strokes, thereby making it possible to change the rotation speed of the output rotation shaft 17 between different speed conditions. The speed change fluid passageway 42 is connectable to a control fluid passageway 112 and a fluid drain passageway 101 through a speed control valve 113. The speed control valve 113 is shown in FIG. 2 as comprising a control valve spool 120 slidably received by the valve casing 13, and a helical spring 121 engaged with one end portion of the control valve spool 120 and urging the control valve spool 120 to move axially against pilot pressure of the working fluid which is supplied to a pilot hydraulic chamber 120a and is exerted on the other end portion of the control valve spool 120. The speed control valve 113 thus constructed is operative to assume two different control valve positions in accordance with the pilot pressure of the working fluid exerted on the other end portion of the control valve spool 120. Turning back to FIG. 1, the control valve positions of the speed control valve 113 consist of a first control valve position G in which the speed change fluid passageway 42 is held in fluid communication with the control fluid passageway 112, and a second control valve position I in which the speed change fluid passageway 42 is held in fluid communication with the fluid drain passageway 101.

The working fluid in the pilot hydraulic chamber 120a of the control spool valve 120 is supplied from a hydraulic pump 114 through a pilot fluid passageways 119 and a fluid feed passageway 116 from a hydraulic pump 114. The pilot fluid passageway 119 is connectable not only to the fluid feed passageway 116 but to a fluid drain passageway 123 through a two-position switching valve 117. The switching valve 117 is operated to assume two different switching valve positions in accordance with manual operation by the crawler vehicle driver. The valve positions of the two-position switching valve 117 consist of a first switching valve position F in which the pilot fluid passageway 119 is held in fluid communication with the fluid feed passageway 116, and a second switching valve position H in which the pilot fluid passageway 119 is held in fluid communication with the fluid drain passageway 123. The hydraulic pump 114 sucks the working fluid from the reservoir tank 56 through a fluid suck passageway 115 in order to force the working fluid into the fluid feed passageway 116. On the fluid feed passageway 116, is provided a relief valve 122 that prevents pressure of the working fluid in the fluid passageway 116 from exceeding a predetermine pressure level.

A reference numeral 111 denotes a shuttle valve that has the control fluid passageway 112 brought into fluid communication selectively with a first selection fluid passageway 81 and a second selection fluid passageway 82. The first and selection fluid passageways 81 and 82 are respectively held in fluid communication with a hydraulic motor side passageway portion 58a of a first supply/discharge fluid passageway 58 and a hydraulic motor side passageway portion 59a of a second supply/discharge fluid passageway 59 described hereinlater in detail. The working fluid in one of the first and second selection fluid passageways 81 and 82 to be brought into fluid communication with the control fluid passageway 112 has a fluid pressure higher than that of the other of the first and second selection fluid passageways 81 and 82.

Figure 4:
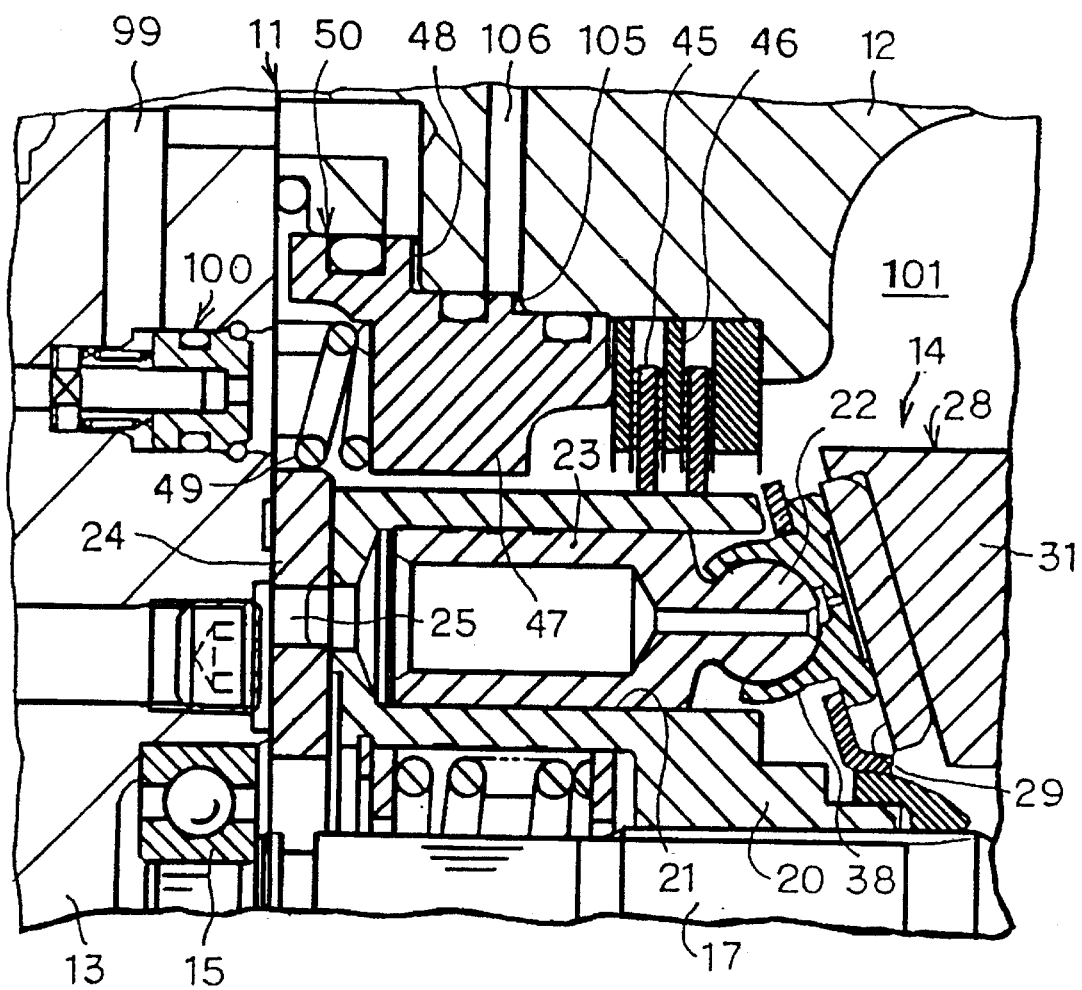
FIG. 4 is an enlarged sectional view partially showing a hydraulic motor and a mechanical brake assembly shown in FIG. 1.

In FIG. 4, a reference numeral 45 denotes a plurality of first friction ring plates arranged in axially spaced and coaxial relationship to one another and securely connected to an outer peripheral surface portion of the cylinder block 20 of the hydraulic motor 14, while a reference numeral 46 denotes a plurality of second friction ring plates securely connected to an inner peripheral surface portion of the cylindrical casing 12 and arranged in alternate and coaxial relationship to the first friction ring plates 45. The first and second friction ring plates 45 and 46 as a whole form a friction plate assembly. The cylindrical casing 12 slidably receives a brake piston 47 which is located between the valve casing 13 and the friction plate assembly and surrounds the cylinder block 20. The brake piston 47 defines a main chamber 48 in cooperation with the cylindrical casing 12. Between the brake piston 47 and the valve casing 13, is placed a plurality of brake springs 49 each urging the brake piston 47 to push the first friction ring plates 45 to the second friction ring plates 46 in turn. When no working fluid of high pressure is supplied to the main hydraulic chamber 48, the brake springs 49 collectively force the brake piston 47 to push the first friction ring plates 45 to the second friction ring plates 46. This results in the fact that the first and second friction ring plates 45 and 46 are caused by the resilient forces of the brake springs 49 to be engaged with one another and generate a large friction force therebetween, and accordingly the output rotation shaft 17 is mechanically braked by the large friction force transmitted through the cylinder block 20 from the friction plate assembly. When the working fluid of high pressure is supplied to the main hydraulic chamber 48, the brake piston 47 is forced by the working fluid pressure in the main hydraulic chamber 48 to axially move against the resilient forces of the brake springs 49. At this time, there is no friction force between the first and second friction ring pates 45 and 46 and as a consequence the output rotation shaft 17 as well as the cylinder block 20 is released from the mechanical brake force based on the brake springs 49. The above-mentioned first and second friction ring plates 45 and 46, brake piston 47 and brake springs 49 collectively form a mechanical brake assembly 50.

The hydraulic system further comprises a shuttle valve 98 provided on the first and second fluid supply/discharge passageways 58 and 59 for having the release fluid passageway 99 brought into fluid communication selectively with the first and second fluid supply/discharge passageways 58 and 59. The working fluid in one of the first and second fluid supply/discharge passageways 58 and 59 brought into fluid communication with the release fluid passageway 99 is higher in pressure than that in the other of the first and second fluid supply/discharge passageways 58 and 59.

The hydraulic system further is shown in FIG. 1 as further comprises a control valve 100 which is provided on the release fluid passageway 99 and operative to assume two different control valve positions in accordance with the fluid pressure in the release fluid passageway 99. The control valve positions of the control valve 100 consist of a first control valve position D in which the working fluid is permitted to flow the release fluid passageway 99 between the shuttle valve 98 and the main hydraulic chamber 48, and a second control valve position E in which the working fluid is discharged from the main hydraulic chamber 48 to the reservoir tank 56 through the fluid drain passageway 101.

The hydraulic system further comprises a directional control valve 53 of three-position switching type which is provided on the first and second fluid supply/discharge passageways 58 and 59 and communicates with a hydraulic pump 54 and a reservoir tank 56 through a fluid feed passageway 55 and a fluid drain passageway 57, respectively. The directional control valve 53 is operative to assume three different directional control valve positions in accordance with manual operation by the crawler vehicle driver. The directional control valve positions consist of a first directional control valve position L in which the working fluid is permitted to be supplied from the hydraulic pump 54 to the first fluid supply/discharge passageway 58 through the fluid feed passageway 55 and to be discharged from the second fluid supply/discharge passageway 59 to the reservoir tank 56 through the fluid drain passageway 55, a second directional control valve position K in which the working fluid is permitted to be discharged from the first and second fluid supply/discharge passageways 58 and 59 to the reservoir tank 56 through the fluid drain passageway 57, and a third directional control valve position J in which the working fluid is permitted to be supplied from the hydraulic pump 54 to the second supply/discharge fluid passageway 59 through the fluid feed passageway 55 and to be discharged from the first supply/discharge fluid passageway 58 through the fluid drain passageway 57. On the fluid feed passageway 55, is provided a relief valve 62 that prevents pressure of the working fluid in the fluid feed passageway 55 from exceeding a predetermine pressure level.

The brake piston 47 and the cylindrical casing 12 further defines a secondary hydraulic chamber 105 held in fluid communication with the release fluid passageway 99 through a fluid feed/return passageway 106. There is provided a brake resistance restrictor 107 on the fluid feed/return passageway 106 for restricting flow of the working fluid in the fluid feed/return passageway 106. The brake piston 47 further has a second piston area portion on which the fluid pressure in the secondary hydraulic chamber 105 is exerted so as to disengage the brake piston 47 from the output rotation shaft 17 of the hydraulic motor 14 against resilient force of the brake springs 49. The second piston area portion of the brake piston 47 has an effective area smaller than that of the first piston area portion of the brake piston 47.

Figure 3:
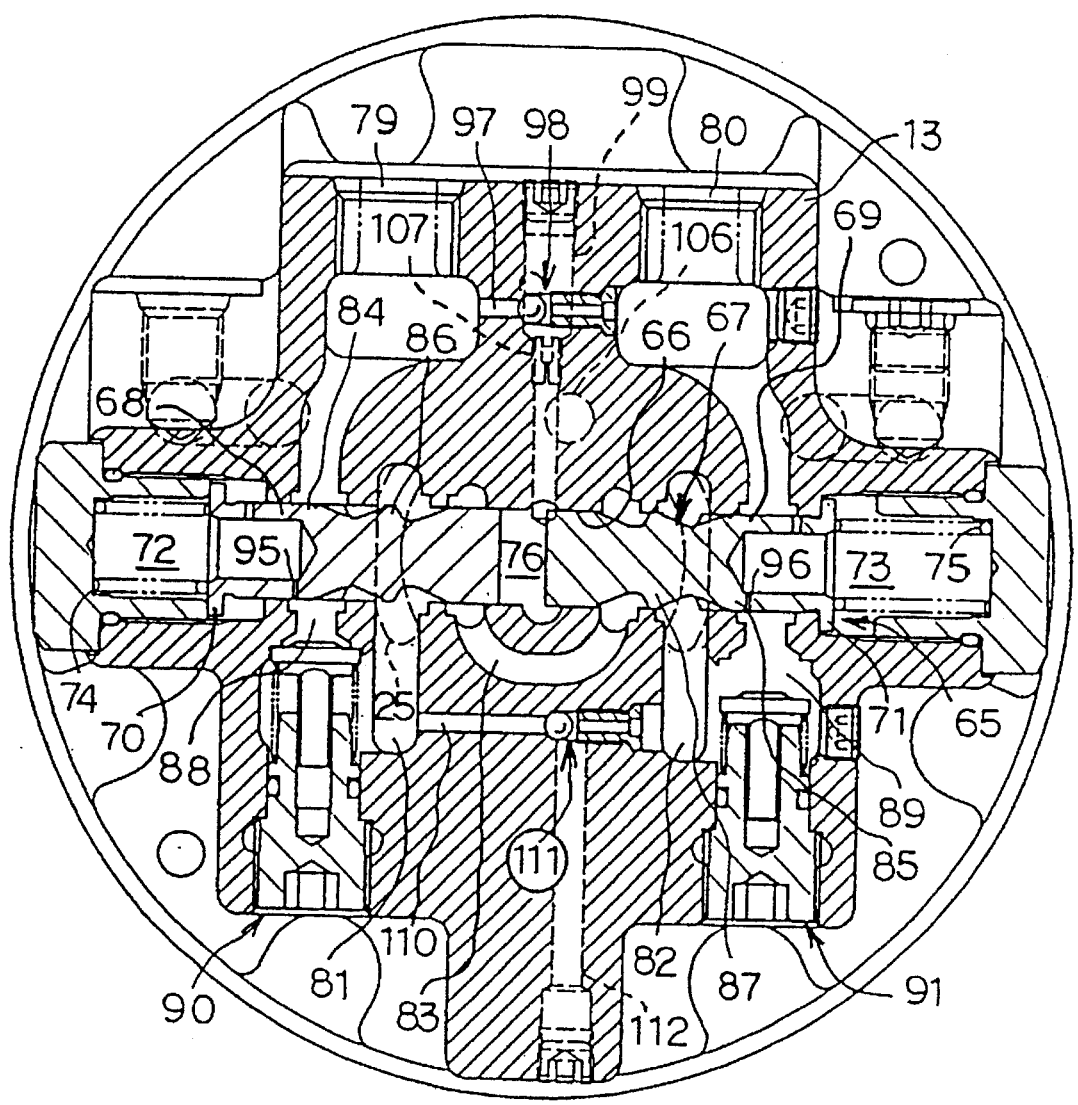
FIG. 3 is a sectional view showing a counterbalance valve shown in FIG. 1.

In FIGS. 1 and 3, the hydraulic system further comprises a counterbalance valve 65 provided on the first and second fluid supply/discharge passageways 58 and 59 between the hydraulic pump 14 and the directional control valve 53. The counterbalance valve 65 is designed to prevent the working fluid from being forced by the hydraulic motor 14 into one of the first and second fluid supply/discharge passageways 58 and 59 when the hydraulic motor 14 is still at work under condition that the directional control valve 53 is shifted to assume the second directional control valve position K. More specifically, the hydraulic system further comprises a first check valve 90 provided on the first fluid supply/ discharge passageway 58 and a second check valve 91 provided on the second fluid supply/discharge passageway 59. The first fluid supply/discharge passageway 58 is divided by the first check valve 90 into a hydraulic motor side passageway portion 58a and a directional control valve side passageway portion 58b. In a similar manner, the second fluid supply/discharge passageway 59 is divided by the second check valve 91 into a hydraulic motor side passageway portion 59a and a directional control valve side passageway portion 59b. As will be best shown in FIG. 3, the counterbalance valve 65 comprises first and second valve spools 68 and 69 arranged into alignment with each other, and respectively having inner end portions 68a and 69a facing to each other and outer end portions 68b and 69b remote from each other. The first and second valve spools 68 and 69 are slidably received by the valve casing 13. The inner end portions 68a and 69a of the first and second valve spools 68 and 69 and the valve casing 13 collectively define a median hydraulic chamber 76 held in fluid communication with the fluid feed/return passageway 106 between the secondary hydraulic chamber 105 and the brake resistance restrictor 107. The outer end portion 68b of the first valve spool 68 defines, in cooperation with the valve casing 13, a first side hydraulic chamber 72 held in fluid communication with the directional control valve side passageway portion 58a of the first fluid support/discharge passageway 58. Similarly, the outer end portion 69b of the second valve spool 69 defines, in cooperation with the valve casing 13, a second side hydraulic chamber 73 held in fluid communication with the directional control valve side passageway portion 59b of the second fluid support/discharge passageway 59.

The first valve spool 68 of the counterbalance valve 65 is formed with a through bore of small diameter serving as a first restrictor 95 which is provided between the first side hydraulic chamber 72 and the directional control valve side passageway portion 58b of the first fluid support/discharge passageway 58 for restricting flow of the working fluid between the first side hydraulic chamber 72 and the directional control valve side passageway portion 58b of the first fluid supply/discharge passageway 58.

The second spool 69 of the counterbalance valve 65 is formed with a through bore of small diameter serving as a second restrictor 96 which is provided between the second side hydraulic chamber 73 and the directional control valve side passageway portion 59b of the second fluid supply/ discharge passageway 59 for restricting flow of the working fluid between the second side hydraulic chamber 73 and the directional control valve side passageway portion 59b of the second supply/discharge fluid passageway 59. The counterbalance valve 65 further comprises first and second return springs 74 and 75 received in the first and second side hydraulic chambers 72 and 73 and urging the first and second valve spools 68 and 69 to move inward, respectively.

The first valve spool 68 of the counterbalance valve 65 is axially movable to assume a first spool position C in which the working fluid is permitted to flow between the hydraulic motor side passageway portion 58a of the first fluid support/ discharge passageway 58 and the directional control valve side passageway portion 58b of the first fluid supply/discharge passageway 58, and a second spool position A in which the working fluid is interrupted from flowing between the hydraulic motor side passageway portion 58a of the first fluid supply/discharge passageway 58 and the directional control valve side passageway portion 58b of the first fluid supply/discharge passageway 58.

The second valve spool 69 of the counterbalance valve 65 is axially movable to assume a first spool position C in which the working fluid is permitted to flow between the hydraulic motor side passageway portion 59a of the second fluid supply/discharge passageway 59 and the directional control valve side passageway portion 59b of the second fluid supply/discharge passageway 59 and a second spool position A in which the working fluid is interrupted from flowing between the hydraulic motor side passageway portion 59a of the second fluid supply/discharge passageway 59 and the directional control valve side passageway portion 59b of the second fluid supply/discharge passageway 59.

When the first and second valve spools 68 and 69 is moved to assume the first spool positions C, respectively, the working fluid is further permitted by the counterbalance valve 65 to flow between the hydraulic motor side passageway portion 58a of the first fluid supply/discharge passageway 58 and the motor side passageway portion 59a of the second fluid supply/discharge passageway 59. When the first and second valve spools 68 and 69 are moved to assume the second spool positions A, respectively, the working fluid is interrupted from flowing between the hydraulic motor side passageway portion 58a of the first fluid supply/discharge passageway 58 and the hydraulic motor side passageway portion 59a of the second fluid supply/discharge passageway 59.

When hydraulic force based on the pressure of the working fluid exerted on the inner end portion 68a of the first valve spool 68 is larger than the sum of hydraulic force based on the pressure of the working fluid exerted on the outer end portion 68b of the first valve spool 68 and resilient force of the first return spring 74, the first valve spool 68 of the counterbalance valve 65 is moved to assume the first spool position C. When the hydraulic force based on the pressure of the working fluid exerted on the inner end portion 68a of the first valve spool 68 is smaller than the sum of the hydraulic force of the working fluid exerted on the outer end portion 68b of the first spool 68 and the resilient force of the first return spring 74, the first valve spool 68 of the counterbalance valve 65 is moved to assume the second spool position A. When, on the other hand, hydraulic force based on the pressure of the working fluid exerted on the inner end portion 69a of the second valve spool 69 is larger than the sum of hydraulic force of the pressure based on the working fluid exerted on the outer end portion 69b of the second valve spool 69 and resilient force of the second return spring 75, the second valve spool 69 of the counterbalance valve 65 is moved to assume the first spool position C. When the hydraulic force based on the pressure of the working fluid exerted on the inner end portion of the second spool 69 is smaller than the sum of the hydraulic force based on the pressure of the working fluid exerted on the outer end portion 69b of the second valve spool 69 and the resilient force of the second return spring 75, the second valve spool 69 of the counterbalance valve 65 is moved to assume the second spool position A.

As will be understood from FIG. 1, the first valve spool 68 of the counterbalance valve 65 further assumes a third spool position B between the first spool position C and the second spool position A of the first valve spool 68. Likewise, the second valve spool 69 of the counterbalance valve 65 further assumes a third spool position B between the first spool position C and the second spool position A of the second valve spool 69. When the first and second valve spools 68 and 69 are moved to assume the third spool positions B, respectively, the working fluid is permitted to flow between the hydraulic motor side passageway portion 58a of the first fluid supply/discharge passageway 58 and the hydraulic motor side passageway portion 58a of the second fluid supply/discharge passageway 59.

The operation of the hydraulic system thus constructed will be described hereinafter. In order that the crawler vehicle is driven by the hydraulic motor 14, the directional control valve 53 is shifted to assume the first directional control valve position L or the third directional control valve position J. On the assumption that, in this instance, the directional control valve 53 is shifted to assume the third directional control valve position J, the following description will be made. When the directional control valve 53 is shifted to assume the third directional control valve position J, the working fluid of high pressure is supplied to the second fluid supply/discharge passageway 59 from the hydraulic pump 54. As a consequence, the second fluid supply/discharge passageway 59, the second selection fluid passageway 82, the fluid feed/return passageway 106, the release fluid passageway 99 and the control fluid passageway 112 serve as high pressure fluid passageways. The working fluid of high pressure is supplied from the hydraulic pump 54 to about half of the cylinder through bores 21 through the fluid feed passageway 55, the second fluid supply/discharge passageway 59 and the arched through bores 25, and accordingly the globular portions of the projection plungers 23 are protruded in turn from the cylinder block 20 to push the slant surface 29 of the cam plate 28. The projection plungers 23 and the shoe members 38 are forced by component of the push force exerted on the projection plungers 23 to move from the thick plate portion 31 of the cam plate 28 toward the thin plate portion 30 of the cam plate 28, thereby rotating the output rotation shaft 17 of the hydraulic motor 14 with the projection plungers 23 and cylinder block 20 to drive the crawler vehicle.

In case that the directional control valve 53 assumes the third directional control valve position J as described above, the working fluid of high pressure in the second fluid supply/discharge passageway 59 is permitted by the shuttle valve 98 to be supplied to the release fluid passageway 99. The working fluid of high pressure in the release fluid passageway 99 causes the control valve 100 to assume the first control valve position D and is supplied to the main hydraulic chamber 48 of the mechanical brake assembly 50. At the same time, the working fluid of high pressure in the release fluid passageway 99 is supplied to the secondary hydraulic chamber 105 of the mechanical brake assembly 50 through the fluid feed/return passageway 106. The brake piston 47 of the mechanical brake assembly 50 is forced to be disengaged by the fluid pressure both in the main hydraulic chamber 48 and the secondary hydraulic chamber 105 from the first and second friction ring plates 45 and 46 against the resilient force of the brake springs 49 and as a result the output rotation shaft 17 of the hydraulic motor 14 is released from the friction force generated between the first and second friction ring plates 45 and 46, i.e., the mechanical brake force generated by the brake springs 49, thereby permitting the output rotation shaft 17 of the hydraulic motor 14 to rotate freely.

The working fluid of high pressure is further supplied not only from the fluid feed/return passageway 106 to the median hydraulic chamber 76 of the counterbalance valve 65 but also from the release fluid passageway 99 to the second side hydraulic chamber 73 of the counterbalance valve 65. This result in the fact that the second valve spool 69 of the counterbalance valve 65 is held in the second spool position A. On the other hand, the first side hydraulic chamber 72 of the counterbalance valve 65 is held in fluid communication with the first fluid supply/discharge passageway 58 serving as a drain passageway, so that the first valve spool 68 of the counterbalance valve 65 is moved to assume the first spool valve position C. The working fluid in the cylinder through bores 21 is discharged to the reservoir tank 56 through the hydraulic motor side passageway portion 58a of the first fluid supply/discharge passageway 58, the fluid passageway 81 and the directional control valve side passageway portion 58b of the first fluid supply/discharge passageway 58 and the fluid drain passageway 57.

If the hydraulic motor 14 is requested to be operated at high speed in order to have small torque generated thereby, the two-position switching valve 117 is shifted to assume the first switching valve position F in which the working fluid of high pressure is supplied from the hydraulic pump 114 to the pilot hydraulic chamber 120a of the speed control valve 113 through the pilot fluid passageway 119. The speed control valve 113 is operated by the pilot fluid pressure in the pilot hydraulic chamber 120a to assume the first speed control valve position G and accordingly the working fluid of high pressure selected by the shuttle valve 111 is supplied to the cylinder chamber 40 through the control fluid passageway 112 and the speed change fluid passageway 42. The working fluid of high pressure in the cylinder chamber 40 causes the press piston 41 to be protruded from the inner surface of the cylindrical casing 12 so that the cam plate 28 is pivoted on the fulcrum member 35 to assume the second position in which the second flat surface 34 of the cam plate 28 is in contact with the inner surface of the cylindrical casing 12. This means that the projection plungers 23 are decreased in stroke and consequently the output rotation shaft 17 as well as the cylinder block 20 is rotated at high speed because of the fact that the working fluid supplied to the hydraulic motor 14 from the hydraulic pump 54 is invariable in quantity.

If, reversely, the hydraulic motor 14 is requested to be operated at low speed in order to have large torque generated thereby, the two-position switching valve 117 is shifted to assume the second switching valve position H in which the working fluid is discharged from the pilot hydraulic chamber 120a of the control valve 113 to the reservoir tank 56 through the pilot fluid passageway 119 and the fluid drain passageway 123. The speed control valve 113 is operated by the helical spring 121 to assume the second speed control valve position I in which the working fluid in the cylinder chamber 40 is discharged to the reservoir tank 56 through the speed change fluid passageway 42 and the fluid drain passageway 101. Therefore, the cam plate 28 is forced by the projection plungers 23 to be pivoted on the fulcrum member 35 and accordingly assumes the first position in which the first flat surface 33 of the cam plate 28 is in contact with the inner surface of the cylindrical casing 12. This means that the projection plungers 23 are increased in stroke and consequently the output rotation shaft 17 as well as the cylinder block 20 is rotated at low speed because of the fact that the working fluid supplied to the hydraulic motor 14 from the hydraulic pump 14 is invariable in quantity.

In order that the crawler vehicle is stopped, the directional control valve 53 is changed from the third directional control valve position J to the second directional control valve position K in which the first and second fluid supply/discharge passageways 58 and 59 are brought into fluid communication with each other and serve as low pressure fluid passageways. Also, the release fluid passageway 99 serves as a low pressure fluid passageway so that the working fluid of high pressure is stopped from being supplied to the main hydraulic chamber 48 of the mechanical brake 50. At the same time, the control valve 100 is shifted to assume the second valve position E in which the working fluid in the main hydraulic chamber 48 is discharged to the reservoir tank 56 through the fluid drain passageway 101. This results in the fact that the brake piston 47 of the mechanical brake assembly 50 is urged by the brake springs 47 to engage the first and second friction ring plates 45 and 46, and the output rotation shaft 17 of the hydraulic motor 14 is braked by the friction force generated between the first and second friction ring plates 45 and 46. In the meantime, the working fluid in the secondary hydraulic chamber 105 is discharged to the reservoir tank 56 through the fluid feed/return passageway 106, the first and second fluid supply/discharge passageways 58 and 59 and the fluid drain passageway 57 in accordance with the motion of the brake piston 47 of the mechanical brake assembly 50. The fluid pressure in the main hydraulic chamber 48 is immediately decreased to the extent of low pressure level of the reservoir tank 56 for a short time between points T1 and T2 shown in FIG. 5, but, in contrast, the fluid pressure in the secondary hydraulic chamber 105 is gradually decreased to the extent of a predetermined pressure level larger than the low pressure level of the reservoir tank 56 for the short time between the points T1 and T2 because of the fact that the brake resistance restrictor 107 is provided on the fluid feed/return passageway 106 for restricting the flow of the working fluid in the fluid feed/return passageway 106. Namely, the fluid pressure in the secondary hydraulic chamber 105 smaller than delivery pressure of the hydraulic pump 54 and gradually decreased is exerted on the second piston area portion of the brake piston 47 of the mechanical brake assembly 50 to prevent the brake piston 47 from being immediately engaged with the first and second friction ring plates 45 and 46.

After the brake piston 47 of the mechanical brake assembly 50 is started to move toward the first and second friction ring plates 45 and 46, the first friction ring plates 45 are engaged with the second friction ring plates 46 by turns at the point T2, thereby applying the mechanical brake force of the mechanical brake 50 to the output rotation shaft 17 of the hydraulic motor 14. Since part of the resilient forces of the brake springs 49 are canceled by the fluid pressure in the secondary hydraulic chamber 105, the mechanical brake force based on the resilient force of the brake springs 49 and the fluid pressure in the secondary hydraulic chamber 105 becomes considerably small in comparison with that based only on the brake springs 49. Therefore, the rotation speed of the rotation shaft 17 of the hydraulic motor 14, i.e., the driving speed of the crawler vehicle is gradually reduced at deceleration represented by 0.4 g or less, so that the crawler vehicle can be effectively prevented from incurring the mighty shock at the time when the crawler vehicle is decelerated and stopped.

Figure 5:
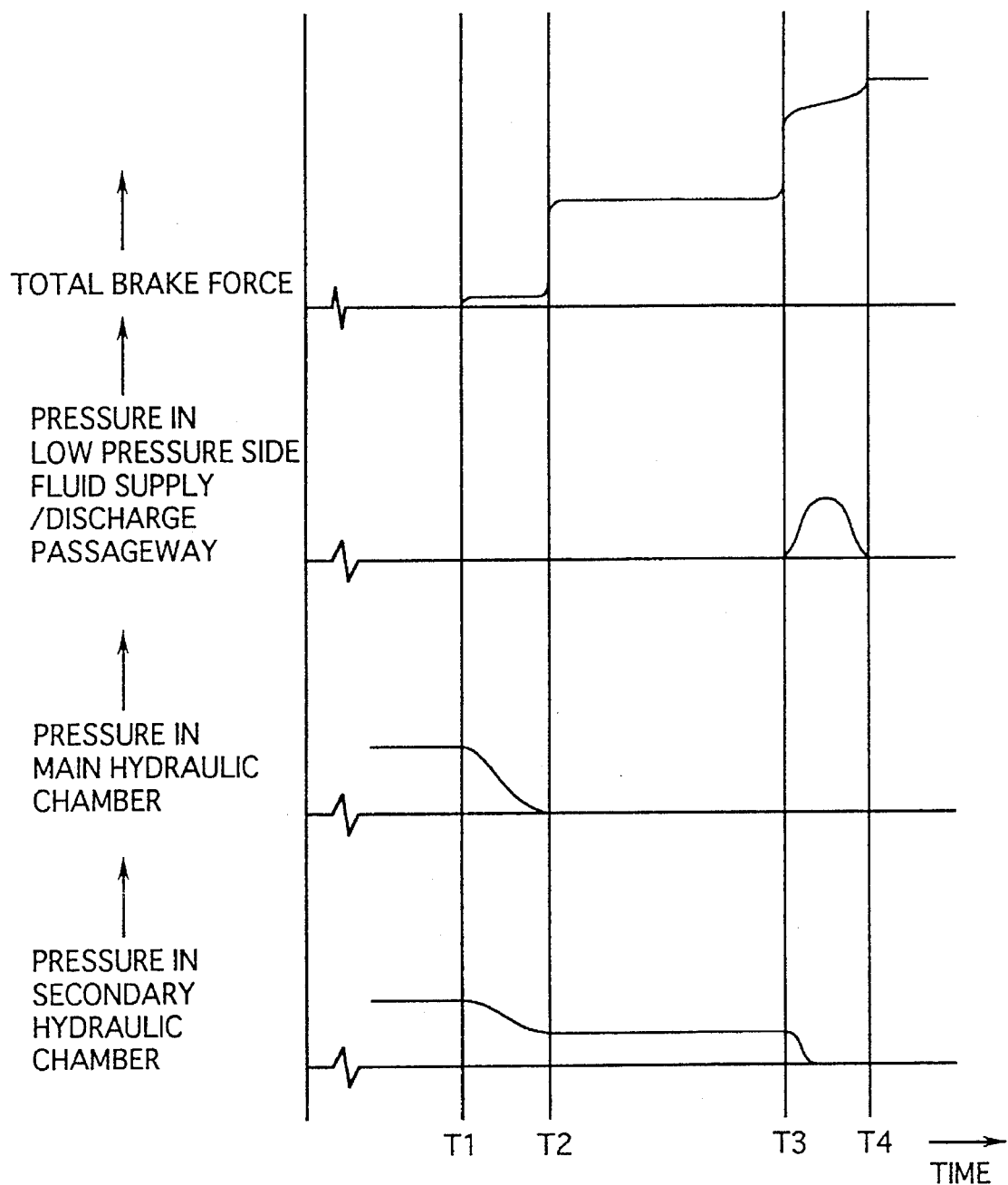
FIG. 5 is a diagram showing variations of fluid pressure in a main hydraulic chamber of a secondary hydraulic chamber of the mechanical brake assembly, a variation of fluid pressure in a lower fluid supply/discharge passageway shown in FIG. 1, and a variation of total brake force applied to an output rotation shaft of the hydraulic motor.

In addition, the fluid pressure in the secondary hydraulic chamber 105 of the mechanical brake assembly 50 is substantially held at a constant low pressure level during a time between the points T2 and T3 as understood from FIG. 5. The reason is described as follows. During the time between the points T2 and T3, the second valve spool 69 of the counterbalance valve 65 is moving from the second spool position A toward the first spool position C, and consequently the working fluid which is equal in quantity to that discharged through the brake resistance restrictor 107 is continuously supplied from the median hydraulic chamber 76 of the counterbalance valve 65 to the fluid feed/return passageway 106 between the secondary hydraulic chamber 105 and the brake resistance restrictor 107. The fluid pressure in the secondary hydraulic chamber 105 as well as in the fluid feed/return fluid passageway 106 between the secondary hydraulic chamber 105 and the brake resistance restrictor 107 is held at a constant low pressure level. Therefore, the mechanical brake force applied by the mechanical brake assembly 50 to the output rotation shaft 17 of the hydraulic motor 14 is held at a constant small force level during a certain time, thereby making it possible to more effectively prevent the crawler vehicle from incurring the mighty shock at the time when the crawler vehicle is decelerated and stopped.

When the rotation of the output rotation shaft 17 of the hydraulic motor 14 is reduced in speed by change the directional control valve 53 from the third directional control valve position J to the second directional control valve position K on condition that the crawler vehicle is driven at high speed, it is possible that the output rotation shaft 17 is not stopped before the point T3. In that case, the hydraulic motor 14 serves as a hydraulic pump. The first valve spool 68 of the counterbalance valve 65 is, however, returned to the second spool position A from the third spool position B to disconnect the hydraulic motor side passageway portion 58a of the first fluid supply/discharge passageway 58 from the directional control valve side passageway portion 58b of the first fluid supply/discharge passageway 58 at the point T3, and accordingly the working fluid in the hydraulic motor side passageway portion 58a of the first fluid supply/discharge passageway 58 is increased in pressure, thereby applying a fluid brake force to the hydraulic motor 14. Therefore, the output rotation shaft 17 of the hydraulic motor 14 is braked and stopped both by the mechanical brake force generated by the mechanical brake assembly 50 and by the fluid brake force based on the operation of the counterbalance valve 65. After the point T3, the brake force applied by the mechanical brake assembly 50 to the hydraulic motor 14 is based on only the mechanical brake force and consequently becomes large in comparison with that based on the mechanical brake force partially canceled by the fluid pressure in the secondary hydraulic chamber 105 because of the fact that the fluid pressure in the secondary hydraulic chamber 105 is reduced to the extent of the low pressure level of the reservoir tank 56. When the hydraulic motor 14 is completely stopped at a point T4 shown in FIG. 5, the mechanical brake force based on the static friction force generated between the first and second friction ring plates 45 and 46 is applied to the output rotation shaft 17 of the hydraulic motor 14. If the hydraulic motor 14 is completely stopped before the point T3, there is provided no fluid brake force applied to the hydraulic motor 14.

If the directional control valve 53 is changed, for instance, from the third directional control valve position J to the first directional control valve position L by way of the second directional control valve position K, the output rotation shaft 17 of the hydraulic motor 14 continues to rotate in the same direction for an extremely short time. At this time, the hydraulic motor 14 tries to suck the working fluid from the second fluid supply/discharge passageway 59 serving as a low pressure passageway and force the working fluid into the first fluid supply/discharge fluid passageway 58 serving as a high pressure passageway. However, the working fluid in the first side hydraulic chamber 72 of the counterbalance valve 65 is increased in pressure to the extent of high pressure level equal to the fluid pressure in the first fluid supply/discharge passageway 58, while the working fluid in the second side hydraulic chamber 73 of the counterbalance valve 65 is reduced in pressure to the extent of the low pressure level of the reservoir tank 56. The first valve spool 68 of the counterbalance valve 65 is moved from the first spool position C to the second spool position A, while the second valve spool 69 of the counterbalance valve 65 is moved from the second spool position A to the first spool position C. During the movements of the first and second valve spools 68 and 69, the fluid pressure in the median hydraulic chamber 76 between the first and second valve spools 69 and 69 is held at the high pressure level and there is no working fluid supplied to and discharged from the median hydraulic chamber 76 of the counterbalance valve 65. The first and second valve spools 68 and 69 are axially moved at the same speeds in invariably spaced relationship to each other, so that the first and second valve spools 68 and 69 simultaneously assume the third spool positions B in which the first selection fluid passageway 81 is brought into fluid communication with the second selection fluid passageway through the connection fluid passageway 83. The working fluid of high pressure is, therefore, discharged from the first fluid supply/discharge passageway 58 to the second fluid supply/discharge passageway 59 containing the working fluid of low pressure therein, thereby preventing surge pressure from arising in the first fluid supply/discharge passageway 58 and preventing cavitation from being caused to the second fluid supply/discharge passageway 59.

Although the first and second valve spools 68 and 69 of the counterbalance valve 65 are formed by different parts, respectively, the first and second valve spools 68 and 69 may be integrally formed with each other. In this instance, a pair of hydraulic chambers in place of the median hydraulic chamber 76 can be defined, in cooperation with the valve casing, by one end portion and the other end portion, respectively, of one spool body collectively formed by the first and second spools. Although the median hydraulic chamber 76 of the counterbalance valve 65 is held in fluid communication with the fluid feed/return passageway 106 in order to the replenish the fluid feed/return passageway 106 with the working fluid contained in the median hydraulic chamber 76, the median hydraulic chamber 76 can be disconnected to the fluid feed/return passageway 106. In this case, the fluid pressure in the secondary hydraulic chamber 105 of the mechanical brake assembly 50 is relatively quickly reduced to the extent of the low pressure level of the reservoir tank 56.

Figure 6:
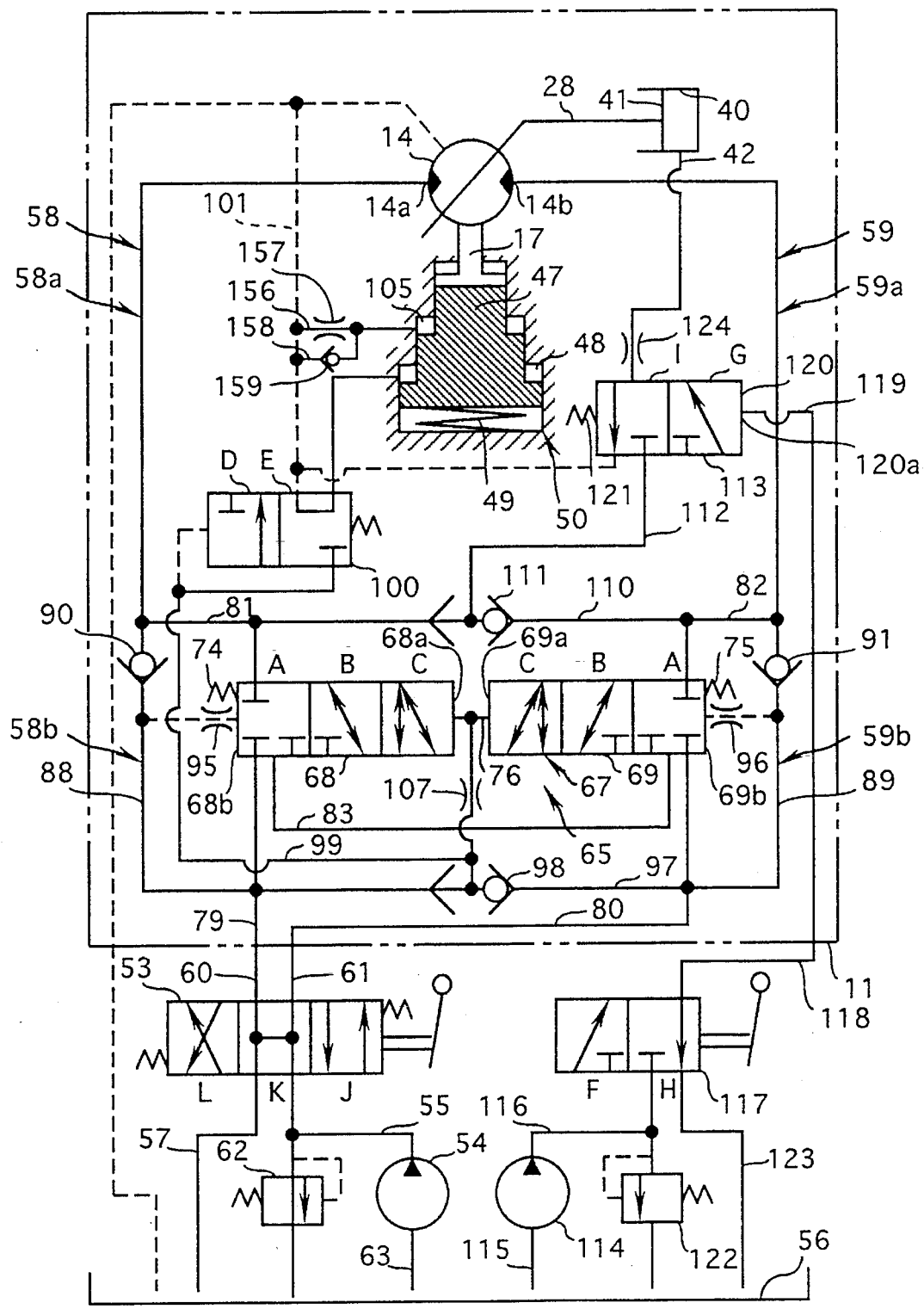
FIG. 6 is a schematic view similar to FIG. 1 but shows a second preferred embodiment of the hydraulic system according to the present invention.

FIG. 6 shows a second preferred embodiment of a hydraulic system according to the present invention. The second embodiment herein shown is a modification of the first embodiment shown in FIGS. 1 to 5 and comprises a hydraulic motor 14, a hydraulic mechanical brake assembly 50, a control valve 100, a speed control valve 113, a shuttle valve 111, a first check valve 90, a second check valve 91, a counterbalance valve 65, a shuttle valve 98, a directional control valve 53, a relief valve 62, a hydraulic pump 54, a two-position switching valve 117, a hydraulic pump 54, a relief valve 122 and a reservoir tank 56 which are entirely similar to their respective counterparts in the first embodiment of FIGS. 1 to 4. The hydraulic system as shown in FIG. 6 differs from the first embodiment of FIGS. 1 to 5 simply in a hydraulic circuit held in fluid communication with the secondary hydraulic chamber 105, and only the difference between the first and second embodiments will be described hereinlater in order to avoid the repeated recitation.

In FIG. 6, the secondary hydraulic chamber 105 of the mechanical brake assembly 50 is held in fluid communication with the reservoir tank 56 through a fluid feed/return passageway 156 that is held in fluid communication with the fluid drain passageway 101. On the fluid feed/return passageway 156, is provided the brake resistance restrictor 157 for restricting flow of the working fluid in the fluid feed/return passageway 156. The fluid drain passageway 101 is held in fluid communication with the fluid feed/return passageway 156 between the brake resistance restrictor 157 and the secondary hydraulic chamber 105 through another fluid feed/return passageway 158 on which a check valve 159 provided for permitting the working fluid to flow only from the reservoir tank to the secondary hydraulic chamber 105 through the fluid drain passageway 101 and the another fluid feed/return passageway 158. For the same reason that is described in foregoing first embodiment shown in FIGS. 1 to 5, the hydraulic system shown in FIG. 6 is advantageous in that the crawler vehicle can be effectively prevented from incurring the mighty shock at the time when the crawler vehicle is decelerated and stopped. Keep in mind that the secondary hydraulic chamber 105 of the mechanical brake assembly 50 is not held in fluid communication with the release fluid passageway 99. Since there is no working fluid supplied to the fluid feed/return passageway 156 between the secondary hydraulic chamber 105 and the brake resistance restrictor 157 during the brake operation of the mechanical brake assembly 50, the hydraulic system shown in FIG. 6 differs from the first embodiment shown in FIGS. 1 to 5 in that the fluid pressure in the secondary hydraulic chamber 105 of the mechanical brake assembly 50 is relatively quickly reduced to the extent of the low pressure level of the reservoir tank 56.

Figure 7:
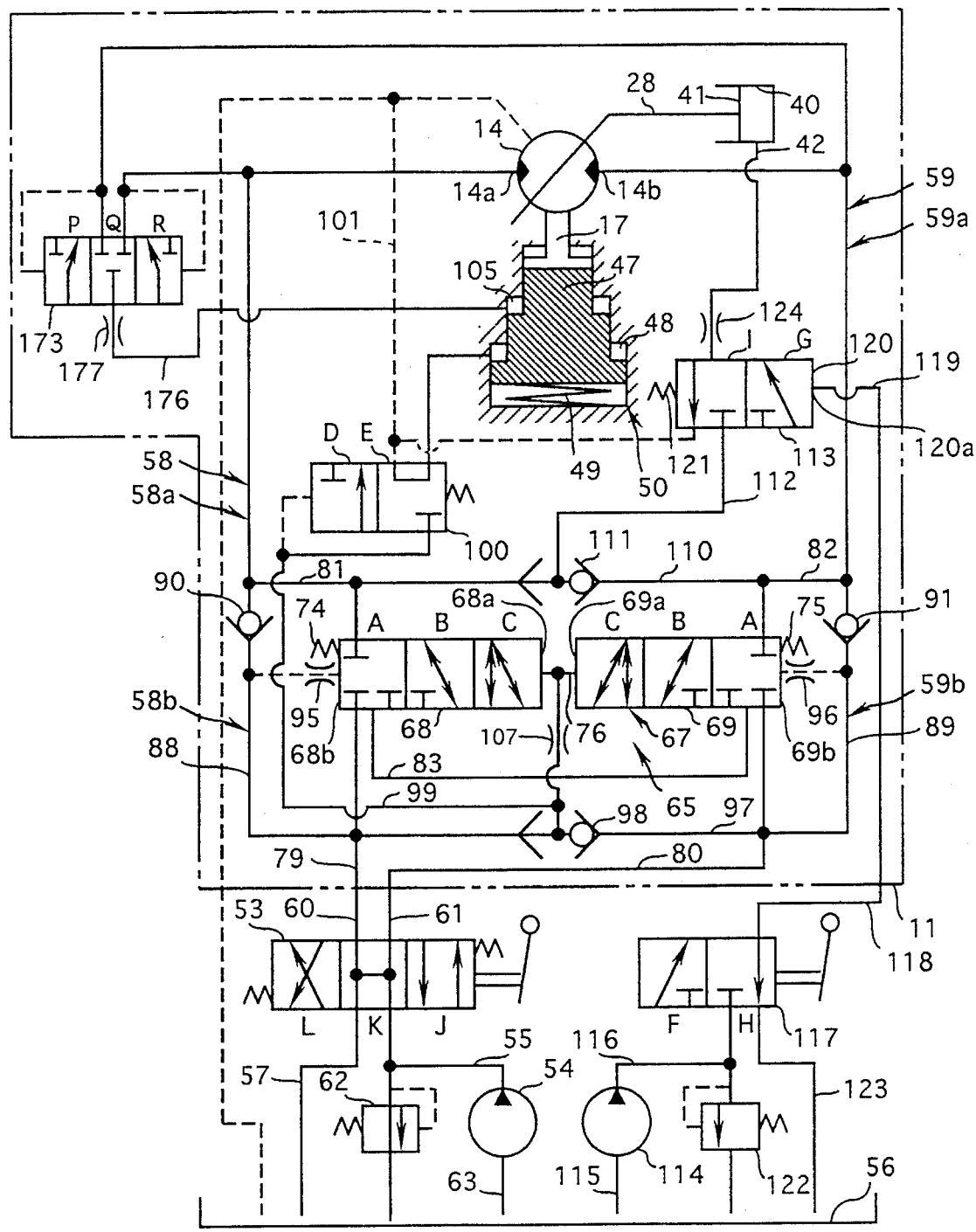
FIG. 7 is a schematic view similar to FIG. 1 but shows a third preferred embodiment of the hydraulic system according to the present invention.
Figure 8:
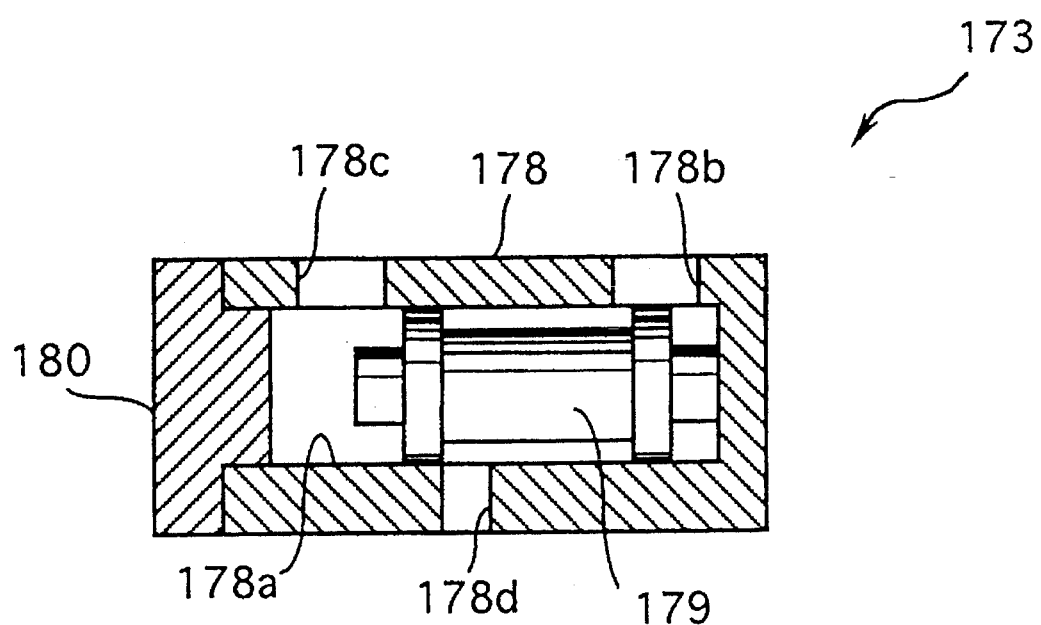
FIG. 8 is a sectional view showing a selection valve shown in FIG. 7.
Figure 9:
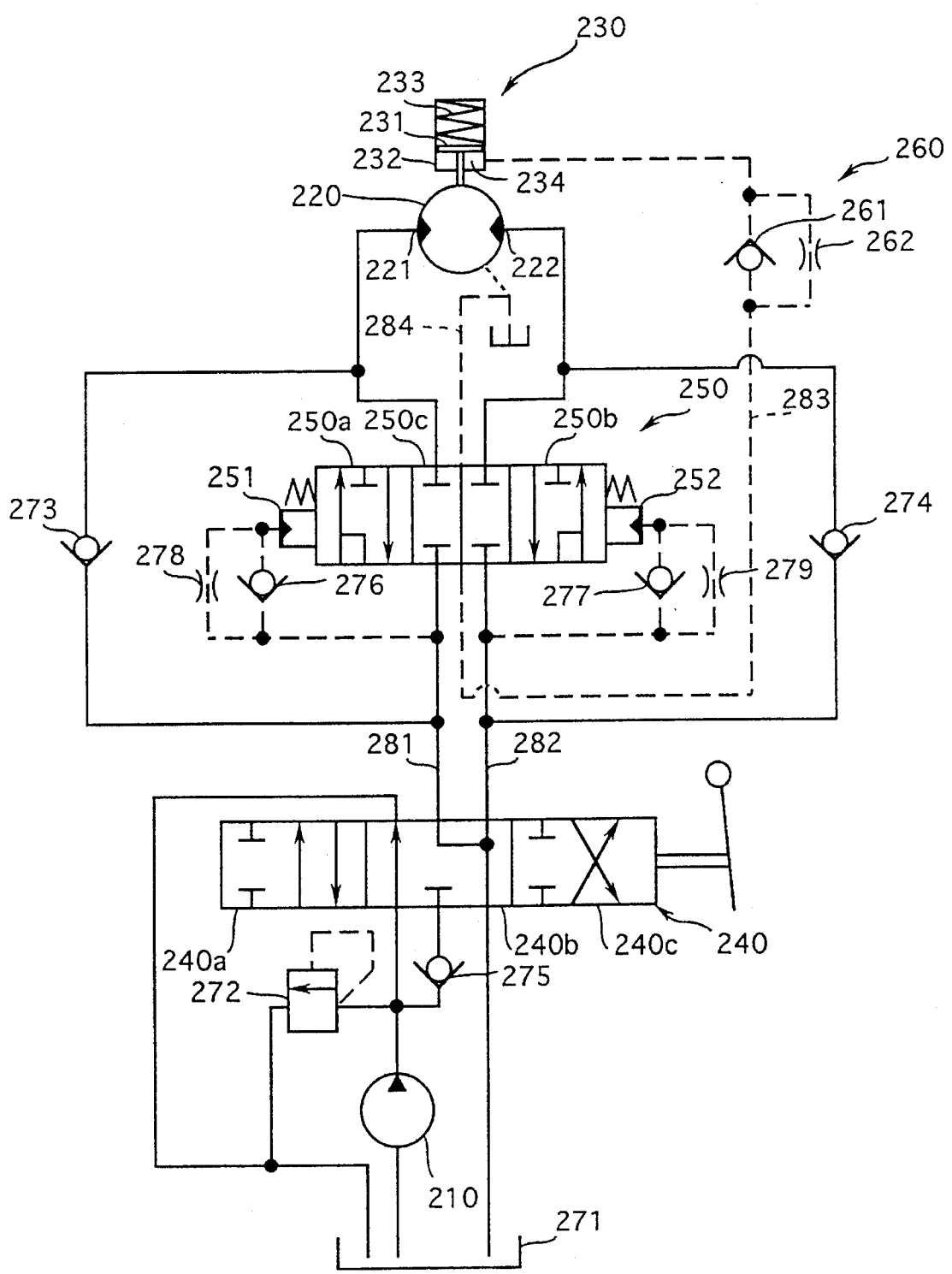
FIG. 9 is a schematic view showing a conventional hydraulic system.

FIGS. 7 and 8 show a third preferred embodiment of a hydraulic system according to the present invention. The third embodiment herein shown is a modification of the first embodiment shown in FIGS. 1 to 5 and comprises a hydraulic motor 14, a hydraulic mechanical brake assembly 50, a control valve 100, a speed control valve 113, a shuttle valve 111, a first check valve 90, a second check valve 91, a counterbalance valve 65, a shuttle valve 98, a directional control valve 53, a relief valve 62, a hydraulic pump 54, a two-position switching valve 117, a hydraulic pump 54, a relief valve 122 and a reservoir tank 56 which are entirely similar to their respective counterparts in the first embodiment of FIGS. 1 to 4. The hydraulic system as shown in FIG. 7 differs from the first embodiment of FIGS. 1 to 5 simply in a hydraulic circuit held in fluid communication with the secondary hydraulic chamber 105, and only the difference between the first and third embodiments will be described hereinlater in order to avoid the repeated recitation.

In FIG. 7, there is provided a selection valve 173 on the first and second fluid supply/discharge passageways 58 and 59. The selection valve 173 is operative to assume three different selection valve positions in accordance with the difference in pressure between the working fluid in the first fluid supply/discharge passageway 58 and the working fluid in the second fluid supply/discharge passageway 59. The selection valve positions consist of a first selection valve position P in which the working fluid is permitted to flow between the first fluid supply/discharge passageway 58 and the secondary hydraulic chamber 105 through a fluid feed/return passageway 176 and interrupted from flowing between the second fluid supply/discharge passageway 59 and the secondary hydraulic chamber 105 through the fluid feed/return passageway 136, a second selection valve position Q in which the working fluid is interrupted from flowing between the first fluid supply/discharge passageway 58 and the secondary hydraulic chamber 105 and between the second fluid supply/discharge passageway 59 and the secondary hydraulic chamber 105 through the fluid feed/return passageway 136, and a third selection valve position R in which the working fluid is permitted to flow between the second fluid supply/discharge passageway 59 and the secondary hydraulic chamber 105 through the fluid feed/return passageway 136 and interrupted from flowing between the first fluid supply/discharge passageway 58 and the secondary hydraulic chamber 105 through the fluid feed/return passageway 136.

The selection valve 173 is operated to assume the first selection valve position P when the pressure of the working fluid in the first fluid supply/discharge passageway 58 is smaller than that in the second fluid supply/discharge passageway 59. When the pressure of the working fluid in the first fluid supply/discharge passageway 58 is equal to that in the second fluid supply/discharge passageway 59, the selection valve 173 is operated to assume the second selection valve position Q. When the pressure of the working fluid in the first fluid supply/discharge passageway 58 is larger than that in the second fluid supply/discharge passageway 59, the selection valve 173 is operated to assume the third selection valve position R. On the fluid feed/return passageway 136, is provided a brake resistance restrictor 177 for restricting flow of the working fluid in the fluid feed/return passageway 176. The selection valve 173 is shown in FIG. 8 as comprising a cylindrical member 178 formed with a cylinder bore 178, a valve spool 179 slidably received by the cylindrical member 178, and a plug member 180 having an opening of the cylinder bore 178*a* hermetically sealed therewith. The cylindrical member 178 is further formed with a first fluid port 178*b* having the cylinder bore 178*a* held in fluid communication with the first fluid supply/discharge passageway 58, a second fluid port 178*c* having the cylinder bore 178*a* held in fluid communication with the second fluid supply/discharge passageway 58, a third fluid port 178*d* having the cylinder bore 178*a* held in fluid communication with the fluid feed/return passageway 176. When the valve spool 179 is in contact with a right side wall of the cylindrical member 178 in the FIG. 8, the selection valve 173 assumes the first selection valve position P in which the fluid feed/return passageway 176 is held in fluid communication with the first fluid supply/discharge fluid passageway 58 through the third fluid port 178*d*, cylinder bore 178*a* and first fluid port 178*b* of the selection valve 173. When the valve spool 179 is located in a longitudinal center of the cylinder bore 178*a*, the selection valve 173 assumes the second selection valve position Q in which the fluid feed/return passageway 176 is held in fluid disconnection with the first and second fluid supply/discharge fluid passageways 58 and 59. When the valve spool 179 is in contact with the plug member 180, the selection valve 173 assumes the third selection valve position R in which the fluid feed/return passageway 176 is held in fluid communication with the second fluid supply/discharge passageway 59 through the third fluid port 178*d*, cylinder bore 178*a* and second fluid port 178*c* of the selection valve 173. For the same reason that is described in the foregoing first embodiment shown in FIGS. 1 to 5, the hydraulic system shown in FIGS. 7 and 8 is advantageous in that the crawler vehicle can be effectively prevented from incurring the mighty shock at the time when the crawler vehicle is decelerated and stopped.

It will be understood by those skilled in the art that the foregoing description is in terms of preferred embodiments of the present invention wherein various changes and modification may be made without departing from the spirit and scope of the invention, as set forth in the appended claims.

What is claimed is:

1. A hydraulic system comprising:

a reservoir tank reserving working fluid;

a hydraulic pump sucking in the working fluid from said reservoir tank to increase in pressure and deliver the working fluid;

a hydraulic motor having first and second inlet/outlet ports and having an output rotation shaft, the working fluid being supplied from said hydraulic pump to one of said first and second inlet/outlet ports through one of first and second fluid supply/discharge passageways and discharged from the other of said first and second inlet/outlet ports to said reservoir tank through the other of said first and second fluid supply/discharge passageways, said output rotation shaft being rotated in a direction when the working fluid from said hydraulic pump is received by said first inlet/outlet port, and said output rotation shaft being rotated in the opposite direction when the working fluid from said hydraulic pump is received by said second inlet/outlet port;

a mechanical brake assembly having a brake piston engageable with said output rotation shaft of said hydraulic motor, a cylindrical casing having said brake piston slidably received therein and a brake spring resiliently urging said brake piston to engage with said output rotation shaft of said hydraulic motor, said brake piston and said cylindrical casing collectively defining a main hydraulic chamber to which the working fluid is supplied through a release fluid passageway and from which the working fluid is discharged through said release fluid passageway, said brake piston having a first piston area portion on which pressure of the working fluid in said main hydraulic chamber is exerted so as to disengage said brake piston from said output rotation shaft of said hydraulic motor against resilient force of said brake spring, said output rotation shaft of said hydraulic motor being mechanically braked by the resilient force of said brake spring through said brake piston when the working fluid is discharged from said main hydraulic chamber of said mechanical brake assembly, and said output rotation shaft of said hydraulic motor being released from said brake piston by fluid pressure of the working fluid in said main hydraulic chamber when the working fluid is supplied to said main hydraulic chamber of said mechanical brake assembly;

a shuttle valve provided on said first and second fluid supply/discharge passageways for having said release fluid passageway held in fluid communication selectively with said first and second fluid supply/discharge passageways, the working fluid in one of said first and second fluid supply/discharge passageways held in fluid communication with said release fluid passageway being higher in pressure than that in the other of said first and second fluid supply/discharge passageways;

a directional control valve provided on said first and second fluid supply/discharge passageways, and operative to assume three different directional control valve positions consisting of a first direction control valve position in which the working fluid is permitted to be supplied from said hydraulic pump to said first fluid supply/discharge passageway and to be discharged from said second fluid supply/discharge passageway to said reservoir tank, a second directional control valve position in which the working fluid is permitted to be discharged from said first and second fluid supply/discharge passageways to said reservoir tank, and a third directional control valve position in which the working fluid is permitted to be supplied from said hydraulic pump to said second fluid supply/discharge passageway and to be discharged from said first fluid supply/discharge passageway; and a counterbalance valve provided on said first and second fluid supply/discharge passageways between said hydraulic pump and said directional control valve, said counterbalance valve being operative to prevent the working fluid from being forced by said hydraulic motor into one of said first and second fluid supply/discharge passageways when said hydraulic motor is still at work under condition that said directional control valve is shifted to assume said second directional control valve position, said brake piston and said cylindrical casing further defining a secondary hydraulic chamber held in fluid communication with said release fluid passageway through a fluid feed/return passageway, said brake piston having a second piston area portion on which pressure of the working fluid in said secondary hydraulic chamber is exerted so as to resist the resilient force of said brake spring, and said hydraulic system further comprising a brake resistance restrictor provided on said fluid feed/return passageway for restricting flow of the working fluid in said fluid feed/return passageway.

2. A hydraulic system as set forth in claim 1, in which said first piston area portion of said brake piston is larger in effective area than said second piston area portion of said brake piston.

3. A hydraulic system as set forth in claim 1, further comprising a control valve provided on said release fluid passageway and operative to assume two different control valve positions consisting of a first control valve position in which the working fluid is permitted to flow through said release fluid passageway between said shuttle valve and said main hydraulic chamber, and a second control valve position in which the working fluid is permitted to be discharged from said main hydraulic chamber to said reservoir tank through said release fluid passageway.

4. A hydraulic system as set forth in claim 1, further comprising a first check valve provided on said first fluid supply/discharge passageway for permitting the fluid working to flow only from the directional control valve to said first inlet/outlet port of said hydraulic motor and a second check valve provided on said second fluid supply/discharge passageway for permitting the working fluid to flow only from the directional control valve to said second inlet/outlet port of said hydraulic motor, said first fluid supply/discharge passageway being divided by said first check valve into a hydraulic motor side passageway portion and a directional control valve side passageway portion, said second fluid supply/discharge passageway being divided by said second check valve into a hydraulic motor side passageway portion and a directional control valve side passageway portion, said counterbalance valve including:

first and second valve spools arranged into alignment with each other and respectively having inner end portions to facing to each other and outer end portions remote from each other;

a valve casing having said first and second valve spools slidably received therein, the inner end portions of said first and second valve spools and said valve casing collectively defining a median hydraulic chamber held in fluid communication with said fluid feed/return passageway between said secondary hydraulic chamber and said brake resistance restrictor, the outer end portion of said first valve spool and said valve casing collectively defining a first side hydraulic chamber held in fluid communication with the directional control valve side passageway portion of said first fluid support/discharge passageway, and the outer end portion of said second valve spool and said valve casing collectively defining a second side hydraulic chamber held in fluid communication with the directional control valve side passageway portion of said second fluid support/discharge passageway, a first return spring urging said first valve ;spool to move toward said second valve spool, a second return spring urging said second valve spool to move toward said first valve spool, a first restrictor provided between said first side hydraulic chamber and the directional control valve side passageway portion of said first fluid support/discharge passageway for restricting flow of the working fluid between said first side hydraulic chamber and the directional control valve side passageway portion of said first fluid supply/discharge passageway, a second restrictor provided between said second side hydraulic chamber and the directional control valve side passageway portion of said second fluid supply/discharge passageway for restricting flow of the working fluid between said second side hydraulic chamber and the directional control valve side passageway portion of said second fluid supply/discharge passageway, said first valve spool of said counterbalance valve being axially movable to assume two different spool positions consisting of a first spool position in which the working fluid is permitted to flow between the hydraulic motor side passageway portion of said first fluid support/discharge passageway and the directional control valve side passageway portion of said first fluid supply/discharge passageway, and a second spool position in which the working fluid is interrupted from flowing between the hydraulic motor side passageway portion of said first fluid supply/discharge passageway and the directional control valve side passageway portion of said first fluid supply/discharge passageway, said second valve spool of said counterbalance valve being axially movable to assume two different spool positions consisting of a first spool position in which the working fluid is permitted to flow between the hydraulic motor side passageway portion of said second fluid supply/discharge passageway and the directional control valve side passageway portion of said second fluid supply/discharge passageway, and a second spool position in which the working fluid is interrupted from flowing between the hydraulic motor side passageway portion of said second fluid supply/discharge passageway and the directional control valve side passageway portion of said second fluid supply/discharge passageway, the working fluid being permitted by said counterbalance valve to flow between the hydraulic motor side passageway portion of said fluid first supply/discharge passageway and the motor side passageway portion of said second fluid supply/discharge passageway when said first and second valve spools are moved to assume the first spool positions, respectively, the working fluid being interrupted by said counterbalance valve from flowing between the hydraulic motor side passageway portion of said first fluid supply/discharge passageway and the hydraulic motor side passageway portion of said second fluid supply/discharge passageway when said first and second valve spools are moved to assume the second spool positions, respectively, said first valve spool of said counterbalance valve being moved to assume said first spool position when hydraulic force of the working fluid exerted on the inner end portion of said first valve spool is larger than the sum of hydraulic force of the working fluid exerted on the outer end portion of said first valve spool and resilient force of said first return spring, said first valve spool of said counterbalance valve being moved to assume said second spool position when the hydraulic force of the working fluid exerted on the inner end portion of said first valve spool is smaller than the sum of the hydraulic force of the working fluid exerted on the outer end portion of said first spool and the resilient force of said first return spring, the second valve spool of said counterbalance valve being moved to assume said second spool position when hydraulic force of the working fluid exerted on the inner end portion of said second valve spool is larger than the sum of hydraulic force of the working fluid exerted on the outer end portion of said second valve spool and resilient force of said second return spring, and the second valve spool of said counterbalance valve being moved to assume said second spool position when the hydraulic force of the working fluid exerted on the inner end portion of said second valve spool is smaller than the sum of the hydraulic force of the working fluid exerted on the outer end portion of said second valve spool and the resilient force of said second return spring.

5. A hydraulic system as set forth in claim 4, in which said first valve spool of said counterbalance valve further assumes a third spool position between the first spool position and the second spool position of said first valve spool, said second valve spool of said counterbalance valve further assuming a third spool position between the first spool position and the second spool position of said second valve spool, and the working fluid being permitted to flow between the motor side passageway portion of said first fluid supply/discharge passageway and the motor side passageway portion of said second fluid supply/discharge passageway when said first and second valve spools are moved to assume the third spool positions, respectively.

6. A hydraulic system comprising:

a reservoir tank reserving working fluid;

a hydraulic pump sucking in the working fluid from said reservoir tank to increase in pressure and deliver the working fluid;

a hydraulic motor having first and second inlet/outlet ports and having an output rotation shaft, the working fluid being supplied from said hydraulic pump to one of said first and second inlet/outlet ports through one of first and second fluid supply/discharge passageways and discharged from the other of said first and second inlet/outlet ports to said reservoir tank through the other of said first and second fluid supply/discharge passageways, said output rotation shaft being rotated in a direction when the working fluid from said hydraulic pump is received by said first inlet/outlet port, and said output rotation shaft being rotated in the opposite direction when the working fluid from said hydraulic pump is received by said second inlet/outlet port;

a mechanical brake assembly having a brake piston engageable with said output rotation shaft of said hydraulic motor, a cylindrical casing having said brake piston slidably received therein and a brake spring resiliently urging said brake piston to engage with said output rotation shaft of said hydraulic motor, said brake piston and said cylindrical casing collectively defining a main hydraulic chamber to which the working fluid is supplied through a release fluid passageway and from which the working fluid is discharged through said release fluid passageway, said brake piston having a first piston area portion on which pressure of the working fluid in said main hydraulic chamber is exerted so as to disengage said brake piston from said output rotation shaft of said hydraulic motor against resilient force of said brake spring, said output rotation shaft of said hydraulic motor being mechanically braked by the resilient force of said brake spring through said brake piston when the working fluid is discharged from said main hydraulic chamber of said mechanical brake assembly, and said output rotation shaft of said hydraulic motor being released from said brake piston by fluid pressure of the working fluid in said main hydraulic chamber when the working fluid is supplied to said main hydraulic chamber of said mechanical brake assembly;

a shuttle valve provided on said first and second fluid supply/discharge passageways for having said release fluid passageway held in fluid communication selectively with said first and second fluid supply/discharge passageways, the working fluid in one of said first and second fluid supply/discharge passageways held in fluid communication with said release fluid passageway being higher in pressure than that in the other of said first and second fluid supply/discharge passageways;

a directional control valve provided on said first and second fluid supply/discharge passageways, and operative to assume three different directional control valve positions consisting of a first directional control valve position in which the working fluid is permitted to be supplied from said hydraulic pump to said first fluid supply/discharge passageway and to be discharged from said second fluid supply/discharge passageway to said reservoir tank, a second directional control valve position in which the working fluid is permitted to be discharged from said first and second fluid supply/discharge passageways to said reservoir tank, and a third directional control valve position in which the working fluid is permitted to be supplied from said hydraulic pump to said second fluid supply/discharge passageway and to be discharged from said first fluid supply/discharge passageway; and a counterbalance valve provided on said first and second fluid supply/discharge passageways between said hydraulic pump and said directional control valve, said counterbalance valve being operative to prevent the working fluid from being forced by said hydraulic motor into one of said first and second fluid supply/ discharge passageways when said hydraulic motor is still at work under condition that said directional control valve is shifted to assume said second directional control valve position, said brake piston and said cylindrical casing further defining a secondary hydraulic chamber held in fluid communication with said reservoir tank through a fluid feed/return passageway, said brake piston having a second piston area portion on which pressure of the working fluid in said secondary hydraulic chamber is exerted so as to resist the resilient force of said brake spring, and said hydraulic system further comprising a brake resistance restrictor provided on said fluid feed/return passageway for restricting flow of the working fluid in said fluid feed/return passageway.

7. A hydraulic system as set forth in claim 6, in which said secondary hydraulic chamber is held in fluid communication with said reservoir tank through another fluid feed/return passageway, said hydraulic system further comprising a check valve provided on said another fluid feed/return passageway for permitting the working fluid to flow only from said reservoir tank to said secondary hydraulic chamber.

8. A hydraulic system as set forth in claim 6, further comprising a control valve provided on said release fluid passageway and operative to assume two different control valve positions consisting of a first control valve position in which the working fluid is permitted to flow through said release fluid passageway between said shuttle valve and said main hydraulic chamber, and a second control valve position in which the working fluid is permitted to be discharged from said main hydraulic chamber to said reservoir tank through said release fluid passageway.

9. A hydraulic system as set forth in claim 6, further comprising a first check valve provided on said first fluid supply/discharge passageway for permitting the fluid working to flow only from the directional control valve to said first inlet/outlet port of said hydraulic motor and a second check valve provided on said second fluid supply/discharge passageway for permitting the working fluid to flow only from the directional control valve to said second inlet/outlet port of said hydraulic motor, said first fluid supply/discharge passageway being divided by said first check valve into a hydraulic motor side passageway portion and a directional control valve side passageway portion, said second fluid supply/discharge passageway being divided by said second check valve into a hydraulic motor side passageway portion and a directional control valve side passageway portion, said counterbalance valve including:

first and second valve spools arranged into alignment with each other and respectively having inner end portions to facing to each other and outer end portions remote from each other;

a valve casing having said first and second valve spools slidably received therein, the inner end portions of said first and second valve spools and said valve casing collectively defining a median hydraulic chamber held in fluid communication with said release fluid passageway, the outer end portion of said first valve spool and said valve casing collectively defining a first side hydraulic chamber held in fluid communication with the directional control valve side passageway portion of said first fluid support/discharge passageway, and the outer end portion of said second valve spool and said valve casing collectively defining a second side hydraulic chamber held in fluid communication with the directional control valve side passageway portion of said second fluid support/discharge passageway, a first return spring urging said first valve spool to move toward said second valve spool, a second return spring urging said second valve spool to move toward said first valve spool, a first restrictor provided between said first side hydraulic chamber and the directional control valve side passageway portion of said first fluid support/discharge passageway for restricting flow of the working fluid between said first side hydraulic chamber and the directional control valve side passageway portion of said first fluid supply/discharge passageway, a second restrictor provided between said second side hydraulic chamber and the directional control valve side passageway portion of said second fluid supply/discharge passageway for restricting flow of the working fluid between said second side hydraulic chamber and the directional control valve side passageway portion of said second fluid supply/discharge passageway, a third restrictor provided between said median hydraulic chamber and said release fluid passageway for restricting flow of the working fluid between said median hydraulic chamber of said counterbalance valve and said release fluid passageway, said first valve spool of said counterbalance valve being axially movable to assume two different spool positions consisting of a first spool position in which the working fluid is permitted to flow between the hydraulic motor side passageway portion of said first fluid support/ discharge passageway and the directional control valve side passageway portion of said first fluid supply/ discharge passageway, and a second spool position in which the working fluid is interrupted from flowing between the hydraulic motor side passageway portion of said first fluid supply/discharge passageway and the directional control valve side passageway portion of said first fluid supply/discharge passageway, said second valve spool of said counterbalance valve being axially movable to assume two different spool positions consisting of a first spool position in which the working fluid is permitted to flow between the hydraulic motor side passageway portion of said second fluid supply/discharge passageway and the directional control valve side passageway portion of said second fluid supply/discharge passageway, and a second spool position in which the working fluid is interrupted from flowing between the hydraulic motor side passageway portion of said second fluid supply/discharge passageway and the directional control valve side passageway portion of said second fluid supply/ discharge passageway, the working fluid being permitted by said counterbalance valve to flow between the hydraulic motor side passageway portion of said fluid first supply/discharge passageway and the motor side passageway portion of said second fluid supply/discharge passageway when said first and second valve spools are moved to assume the first spool positions, respectively, the working fluid being interrupted by said counterbalance valve from flowing between the hydraulic motor side passageway portion of said first fluid supply/discharge passageway and the hydraulic motor side passageway portion of said second fluid supply/discharge passageway when said first and second valve spools are moved to assume the second spool positions, respectively, said first valve spool of said counterbalance valve being moved to assume said first spool position when hydraulic force of the working fluid exerted on the inner end portion of said first valve spool is larger than the sum of hydraulic force of the working fluid exerted on the outer end portion of said first valve spool and resilient force of said first return spring, said first valve spool of said counterbalance valve being moved to assume said second spool position when the hydraulic force of the working fluid exerted on the inner end portion of said first valve spool is smaller than the sum of the hydraulic force of the working fluid exerted on the outer end portion of said first spool and the resilient force of said first return spring, the second valve spool of said counterbalance valve being moved to assume said second spool position when hydraulic force of the working fluid exerted on the inner end portion of said second valve spool is larger than the sum of hydraulic force of the working fluid exerted on the outer end portion of said second valve spool and resilient force of said second return spring, and the second valve spool of said counterbalance valve being moved to assume said second spool position when the hydraulic force of the working fluid exerted on the inner end portion of said second valve spool is smaller than the sum of the hydraulic force of the working fluid exerted on the outer end portion of said second valve spool and the resilient force of said second return spring.

10. A hydraulic system as set forth in claim 9, in which said first valve spool of said counterbalance valve further assumes a third spool position between the first spool position and the second spool position of said first valve spool, said second valve spool of said counterbalance valve further assuming a third spool position between the first spool position and the second spool position of said second valve spool, and the working fluid being permitted to flow between the motor side passageway portion of said first fluid supply/discharge passageway and the motor side passageway portion of said second fluid supply/discharge passageway when said first and second valve spools are moved to assume the third spool positions, respectively.

11. A hydraulic system comprising:

a reservoir tank reserving working fluid;

a hydraulic pump sucking in the working fluid from said reservoir tank to increase in pressure and deliver the working fluid;

a hydraulic motor having first and second inlet/outlet ports and having an output rotation shaft, the working fluid being supplied from said hydraulic pump to one of said first and second inlet/outlet ports through one of first and second fluid supply/discharge passageways and discharged from the other of said first and second inlet/outlet ports to said reservoir tank through the other of said first and second fluid supply/discharge passageways, said output rotation shaft being rotated in a direction when the working fluid from said hydraulic pump is received by said first inlet/outlet port, and said output rotation shaft being rotated in the opposite direction when the working fluid from said hydraulic pump is received by said second inlet/outlet port;

a mechanical brake assembly having a brake piston engageable with said output rotation shaft of said hydraulic motor, a cylindrical casing having said brake piston slidably received therein and a brake spring resiliently urging said brake piston to engage with said output rotation shaft of said hydraulic motor, said brake piston and said cylindrical casing collectively defining a main hydraulic chamber to which the working fluid is supplied through a release fluid passageway and from which the working fluid is discharged through said release fluid passageway, said brake piston having a first piston area portion on which pressure of the working fluid in said main hydraulic chamber is exerted so as to disengage said brake piston from said output rotation shaft of said hydraulic motor against resilient force of said brake spring, said output rotation shaft of said hydraulic motor being mechanically braked by the resilient force of said brake spring through said brake piston when the working fluid is discharged from said main hydraulic chamber of said mechanical brake assembly, and said output rotation shaft of said hydraulic motor being released from said brake piston by fluid pressure of the working fluid in said main hydraulic chamber when the working fluid is supplied to said main hydraulic chamber of said mechanical brake assembly;

a shuttle valve provided on said first and second fluid supply/discharge passageways for having said release fluid passageway held in fluid communication selectively with said first and second fluid supply/discharge passageways, the working fluid in one of said first and second fluid supply/discharge passageways held in fluid communication with said release fluid passageway being higher in pressure than that in the other of said first and second fluid supply/discharge passageways;

a directional control valve provided on said first and second fluid supply/discharge passageways, and operative to assume three different directional control valve positions consisting of a first directional control valve position in which the working fluid is permitted to be supplied from said hydraulic pump to said first fluid supply/discharge passageway and to be discharged from said second fluid supply/discharge passageway to said reservoir tank, a second directional control valve position in which the working fluid is permitted to be discharged from said first and second fluid supply/discharge passageways to said reservoir tank, and a third directional control valve position in which the working fluid is permitted to be supplied from said hydraulic pump to said second fluid supply/discharge passageway and to be discharged from said first fluid supply/discharge passageway; and a counterbalance valve provided on said first and second fluid supply/discharge passageways between said hydraulic pump and said directional control valve, said counterbalance valve being operative to prevent the working fluid from being forced by said hydraulic motor into one of said first and second fluid supply/ discharge passageways when said hydraulic motor is still at work under condition that said directional control valve is shifted to assume said second directional control valve position, said brake piston and said casing further defining a secondary hydraulic chamber, said brake piston having a second piston area portion on which pressure of the working fluid in said secondary hydraulic chamber is exerted so as to resist the resilient force of said brake spring, said hydraulic system further comprising a selection valve provided on said first and second fluid supply/discharge passageways and operative to assume three different valve positions consisting of a first selection valve position in which the working fluid is permitted to flow between said first fluid supply/discharge passageway and said secondary hydraulic chamber through a fluid feed/return passageway and interrupted from flowing between said second fluid supply/discharge passageway and said secondary hydraulic chamber through said fluid feed/return passageway, a second selection valve position in which the working fluid is interrupted from flowing between said first fluid supply/discharge passageway and said secondary hydraulic chamber and between said second fluid supply/discharge passageway and said secondary hydraulic chamber through said fluid feed/return passageway, and a third selection valve position in which the working fluid is permitted to flow between said second fluid supply/discharge passageway and said secondary hydraulic chamber through said fluid feed/return passageway and interrupted from flowing between said first fluid supply/discharge passageway and said secondary hydraulic chamber through said fluid feed/return passageway, said selection valve being operated to assume said first selection valve position when the pressure of the working fluid in said first fluid supply/discharge passageway is smaller than that in said second fluid supply/discharge passageway, said selection valve being operated to assume said second selection valve position when the pressure of the working fluid in said first fluid supply/discharge passageway is equal to that in said second fluid supply/discharge passageway, said selection valve being operated to assume said third selection valve position when the pressure of the working fluid in said first fluid supply/discharge passageway is larger than that in said second fluid supply/discharge passageway, and said hydraulic system further comprising a brake resistance restrictor provided on said fluid feed/return passageway for restricting flow of the working fluid in said fluid feed/return passageway.

12. A hydraulic system as set forth in claim 11, further comprising a control valve provided on said release fluid passageway and operative to assume two different control valve positions consisting of a first control valve position in which the working fluid is permitted to flow through said release fluid passageway between said shuttle valve and said main hydraulic chamber, and a second control valve position in which the working fluid is permitted to be discharged from said main hydraulic chamber to said reservoir tank through said release fluid passageway.

13. A hydraulic system as set forth in claim 11, further comprising a first check valve provided on said first fluid supply/discharge passageway for permitting the fluid working to flow only from the directional control valve to said first inlet/outlet port of said hydraulic motor and a second check valve provided on said second fluid supply/discharge passageway for permitting the working fluid to flow only from the directional control valve to said second inlet/outlet port of said hydraulic motor, said first fluid supply/discharge passageway being divided by said first check valve into a hydraulic motor side passageway portion and a directional control valve side passageway portion, said second fluid supply/discharge passageway being divided by said second check valve into a hydraulic motor side passageway portion and a directional control valve side passageway portion, said counterbalance valve including:

first and second valve spools arranged into alignment with each other and respectively having inner end portions to facing to each other and outer end portions remote from each other;

a valve casing having said first and second valve spools slidably received therein, the inner end portions of said first and second valve spools and said valve casing collectively defining a median hydraulic chamber held in fluid communication with said release fluid passageway, the outer end portion of said first valve spool and said valve casing collectively defining a first side hydraulic chamber held in fluid communication with the directional control valve side passageway portion of said first fluid support/discharge passageway, and the outer end portion of said second valve spool and said valve casing collectively defining a second side hydraulic chamber held in fluid communication with the directional control valve side passageway portion of said second fluid support/discharge passageway, a first return spring urging said first valve spool to move toward said second valve spool, a second return spring urging said second valve spool to move toward said first valve spool, a first restrictor provided between said first side hydraulic chamber and the directional control valve side passageway portion of said first fluid support/discharge passageway for restricting flow of the working fluid between said first side hydraulic chamber and the directional control valve side passageway portion of said first fluid supply/discharge passageway, a second restrictor provided between said second side hydraulic chamber and the directional control valve side passageway portion of said second fluid supply/discharge passageway for restricting flow of the working fluid between said second side hydraulic chamber and the directional control valve side passageway portion of said second fluid supply/discharge passageway, a third restrictor provided between said median hydraulic chamber and said release fluid passageway for restricting flow of the working fluid between said median hydraulic chamber of said counterbalance valve and said release fluid passageway, said first valve spool of said counterbalance valve being axially movable to assume two different spool positions consisting of a first spool position in which the working fluid is permitted to flow between the hydraulic motor side passageway portion of said first fluid support/discharge passageway and the directional control valve side passageway portion of said first fluid supply/discharge passageway, and a second spool position in which the working fluid is interrupted from flowing between the hydraulic motor side passageway portion of said first fluid supply/discharge passageway and the directional control valve side passageway portion of said first fluid supply/discharge passageway, said second valve spool of said counterbalance valve being axially movable to assume two different spool positions consisting of a first spool position in which the working fluid is permitted to flow between the hydraulic motor side passageway portion of said second fluid supply/discharge passageway and the directional control valve side passageway portion of said second fluid supply/discharge passageway, and a second spool position in which the working fluid is interrupted from flowing between the hydraulic motor side passageway portion of said second fluid supply/discharge passageway and the directional control valve side passageway portion of said second fluid supply/discharge passageway, the working fluid being permitted by said counterbalance valve to flow between the hydraulic motor side passageway portion of said fluid first supply/discharge passageway and the motor side passageway portion of said second fluid supply/discharge passageway when said first and second valve spools are moved to assume the first spool positions, respectively, the working fluid being interrupted by said counterbalance valve from flowing between the hydraulic motor side passageway portion of said first fluid supply/discharge passageway and the hydraulic motor side passageway portion of said second fluid supply/discharge passageway when said first and second valve spools are moved to assume the second spool positions, respectively, said first valve spool of said counterbalance valve being moved to assume said first spool position when hydraulic force of the working fluid exerted on the inner end portion of said first valve spool is larger than the sum of hydraulic force of the working fluid exerted on the outer end portion of said first valve spool and resilient force of said first return spring, said first valve spool of said counterbalance valve being moved to assume said second spool position when the hydraulic force of the working fluid exerted on the inner end portion of said first valve spool is smaller than the sum of the hydraulic force of the working fluid exerted on the outer end portion of said first spool and the resilient force of said first return spring, the second valve spool of said counterbalance valve being moved to assume said second spool position when hydraulic force of the working fluid exerted on the inner end portion of said second valve spool is larger than the sum of hydraulic force of the working fluid exerted on the outer end portion of said second valve spool and resilient force of said second return spring, and the second valve spool of said counterbalance valve being moved to assume said second spool position when the hydraulic force of the working fluid exerted on the inner end portion of said second valve spool is smaller than the sum of the hydraulic force of the working fluid exerted on the outer end portion of said second valve spool and the resilient force of said second return spring.

14. A hydraulic system as set forth in claim 13, in which said first valve spool of said counterbalance valve further assumes a third spool position between the first spool position and the second spool position of said first valve spool, said second valve spool of said counterbalance valve further assuming a third spool position between the first spool position and the second spool position of said second valve spool, and the working fluid being permitted to flow between the motor side passageway portion of said first fluid supply/discharge passageway and the motor side passageway portion of said second fluid supply/discharge passageway when said first and second valve spools are moved to assume the third spool positions, respectively.

* * * * *